United States Patent
Liu

(10) Patent No.: US 9,622,115 B2
(45) Date of Patent: Apr. 11, 2017

(54) CHANNEL NEGOTIATION METHOD, DEVICE, AND SYSTEM

(71) Applicant: Huawei Technologies Co., Ltd., Shenzhen (CN)

(72) Inventor: Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 14/663,900

(22) Filed: Mar. 20, 2015

(65) Prior Publication Data

US 2015/0195744 A1    Jul. 9, 2015

Related U.S. Application Data

(63) Continuation of application No. PCT/CN2013/083668, filed on Sep. 17, 2013.

(30) Foreign Application Priority Data

Sep. 20, 2012  (CN) .......................... 2012 1 0351744

(51) Int. Cl.
*H04W 28/08* (2009.01)
*H04W 28/20* (2009.01)
(Continued)

(52) U.S. Cl.
CPC ......... *H04W 28/085* (2013.01); *H04W 16/14* (2013.01); *H04W 28/20* (2013.01);
(Continued)

(58) Field of Classification Search
None
See application file for complete search history.

(56) References Cited

U.S. PATENT DOCUMENTS

| 2004/0028003 | A1* | 2/2004 | Diener | H04L 1/0001 370/319 |
| 2008/0268858 | A1* | 10/2008 | Wu | H04W 16/10 455/448 |
| 2011/0255468 | A1 | 10/2011 | Vajapeuam et al. | |

FOREIGN PATENT DOCUMENTS

| CN | 101001438 A | 7/2007 |
| CN | 102026297 A | 4/2011 |

(Continued)

OTHER PUBLICATIONS

Foreign Communication From a Counterpart Application, European Application No. 13840024.7, Extended European Search Report dated Jul. 2, 2015, 7 pages.

(Continued)

*Primary Examiner* — Kouroush Mohebbi
(74) *Attorney, Agent, or Firm* — Conley Rose, P.C.

(57) ABSTRACT

A channel negotiation method, device, and system are provided. The channel negotiation method includes obtaining channel occupancy information; sending, according to the channel occupancy information, a channel negotiation execution frame that includes a channel switching manner to a network device in at least one established network, so that the network device in the at least one established network switches a current operating channel according to the channel switching manner to generate an idle channel; and receiving a channel negotiation execution acknowledgement frame fed back by the network device in the at least one established network, and performing a networking operation on the idle channel. The channel negotiation method provided in the embodiments of the present invention can improve a bandwidth utilization ratio and a data transmission rate.

7 Claims, 13 Drawing Sheets

(51) Int. Cl.
*H04W 16/14* (2009.01)
*H04W 28/26* (2009.01)
*H04W 72/04* (2009.01)
*H04W 16/10* (2009.01)

(52) U.S. Cl.
CPC ....... *H04W 28/26* (2013.01); *H04W 72/0453* (2013.01); *H04W 16/10* (2013.01)

(56) References Cited

FOREIGN PATENT DOCUMENTS

| CN | 102892151 A | 1/2013 |
|---|---|---|
| WO | 2012044706 A1 | 4/2012 |

OTHER PUBLICATIONS

Partial English Translation and Abstract of Chinese Patent Application No. CN102892151A, Apr. 10, 2015, 4 pages.

Foreign Communication Form a Counterpart Application, PCT Application No. PCT/CN2013/083668, English Translation of International Search Report dated Dec. 12, 2013, 2 pages.

Foreign Communication Form a Counterpart Application, PCT Application No. PCT/CN2013/083668, English Translation of Written Opinion dated Dec. 12, 2013, 10 pages.

"Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension," 802.15.3c, Oct. 12, 2009, 203 pages.

"Information technology—Telecommunications and information exchange between systems—High rate 60 GHz PHY, MAC and PALs," International Standard, ISO/IEC 13156, Oct. 1, 2011, 282 pages.

"Part 11: Wireless LAN Medium Access Control (MAC) and Physical Layer (PHY) Specifications—Amendment 3: Enhancements for Very High Troughput in the 60 GHz Band," IEEE P802.11ad/D7.0, Apr. 2012, 661 pages.

\* cited by examiner

CHANNEL NEGOTIATION METHOD, DEVICE, AND SYSTEM

CROSS-REFERENCE TO RELATED APPLICATIONS

This application is a continuation of International Application No. PCT/CN2013/083668, filed on Sep. 17, 2013, which claims priority to Chinese Patent Application No. 201210351744.9, filed on Sep. 20, 2012, both of which are hereby incorporated by reference in their entireties.

TECHNICAL FIELD

Embodiments of the present invention relate to communications technologies, and in particular, to a channel negotiation method, device, and system.

BACKGROUND

While radio communications spectrum resources tend to be increasingly scarce and a data transmission rate tends to be increasingly higher, a wireless short-distance communications technology at a 60 gigahertz (GHz) band gains more attention and becomes one of technologies with greatest potentialities among future radio communications technologies. Many countries and regions allocate 5-9 GHz unlicensed continuous bands around 60 GHz for general purposes.

Internationally, according to the 60 GHz millimeter wave communications standard, four 2.16 GHz bandwidth channels are universally assigned. China has opened 59-64 GHz bands so far, which can accommodate two 2.16 GHz bandwidth channels. To satisfy networking requirements of more than two networks, two 2.16 GHz bandwidth channels are further divided into four 1.08 GHz bandwidth channels according to the Chinese millimeter wave communications standard, which enables a network device to operate on a 1.08 GHz or 2.16 GHz band dynamically as required and interwork with a 2.16 GHz bandwidth device compliant with the international millimeter wave communications standard, so that compatibility requirements are satisfied.

In the prior art, the four 1.08 GHz bands are assigned according to the millimeter wave communications standard, which may lead to problems of a low bandwidth utilization ratio and a low data transmission rate.

SUMMARY

Embodiments of the present invention provide a channel negotiation method, device, and system to overcome problems of a low bandwidth utilization ratio and a low data transmission rate.

According to one aspect, an embodiment of the present invention provides a channel negotiation method, including obtaining channel occupancy information; sending, according to the channel occupancy information, a channel negotiation execution frame that includes a channel switching manner to a network device in at least one established network, so that the network device in the at least one established network switches a current operating channel according to the channel switching manner to generate an idle channel; and receiving a channel negotiation execution acknowledgement frame fed back by the network device in the at least one established network, and performing a networking operation on the idle channel.

Further, before the sending a channel negotiation execution frame that includes a channel switching manner to a network device in at least one established network, the method further includes sending a channel negotiation request frame that includes the channel switching manner to the network device in the at least one established network, so that the network device in the at least one established network determines whether a subordinate device is able to operate on a channel obtained after channel switching is performed according to the channel switching manner; and receiving a channel negotiation success response frame that is sent by the network device in the at least one established network after determining that the subordinate device is able to operate on the channel.

Further, the obtaining channel occupancy information includes obtaining channel occupancy information indicating that two idle subchannels exist in two channels, where the two idle subchannels belong to different channels respectively, and two occupied subchannels do not belong to a same established network; and the sending, according to the channel occupancy information, a channel negotiation execution frame that includes a channel switching manner to a network device in at least one established network, includes sending the channel negotiation execution frame that includes the channel switching manner to the network device in the at least one established network, where the channel switching manner is to adjust an operating frequency of the network device in the at least one established network to an operating frequency that belongs to a same channel.

Further, the obtaining channel occupancy information includes obtaining channel occupancy information indicating that two idle subchannels exist in four subchannels, where the two idle subchannels belong to different channels respectively, and two occupied subchannels belong to a first established network and a second established network respectively; and the sending, according to the channel occupancy information, a channel negotiation execution frame that includes a channel switching manner to a network device in at least one established network, includes sending a channel negotiation execution frame that includes a first channel switching manner to a network device in the first established network, and sending a channel negotiation execution frame that includes a second channel switching manner to a network device in the second established network, where the first channel switching manner and the second channel switching manner are to adjust an operating frequency of the network device in the first established network and an operating frequency of the network device in the second established network to operating frequencies that belong to a same channel.

Further, the obtaining channel occupancy information includes obtaining channel occupancy information indicating that one idle subchannel exists in four subchannels, two occupied subchannels of three occupied subchannels belong to a first established network and a remaining occupied subchannel belongs to a second established network; and the sending, according to the channel occupancy information, a channel negotiation execution frame that includes a channel switching manner to a network device in at least one established network, includes sending a channel negotiation execution frame that includes a first channel switching manner to a network device in the first established network, and sending a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to adjust an operating frequency of the network device in the second established network; and the adjusted operating frequency of the network device in the first established network and the adjusted operating frequency of the network device in the second established network are operating frequencies that belong to a same channel.

Further, the obtaining channel occupancy information includes obtaining channel occupancy information indicating that no idle subchannel exists in four subchannels, two occupied subchannels belong to a first established network, and two other occupied subchannels belong to a second established network; and the sending, according to the channel occupancy information, a channel negotiation execution frame that includes a channel switching manner to a network device in at least one established network, includes sending a channel negotiation execution frame that includes a first channel switching manner to a network device in the first established network, and sending a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to reduce a bandwidth of two subchannels occupied by the network device in the second established network to a bandwidth of one subchannel occupied, and adjust the operating frequency of the network device with the reduced bandwidth; and the adjusted operating frequency of the network device in the first established network and the adjusted operating frequency of the network device in the second established network are operating frequencies that belong to a same channel.

Further, the obtaining channel occupancy information includes obtaining channel occupancy information indicating that no idle subchannel exists in four subchannels, two occupied subchannels belong to a first established network, and two other occupied subchannels belong to a second established network; before the sending, according to the channel occupancy information, a channel negotiation execution frame that includes a channel switching manner to a network device in at least one established network, the method further includes sending a channel negotiation request frame that includes a first channel switching manner to a network device in the first established network, so that the network device in the first established network determines whether a subordinate device is able to operate on a channel obtained after channel switching is performed according to the first channel switching manner, and sending a channel negotiation request frame that includes a second channel switching manner to a network device in the second established network, so that the network device in the second established network determines whether a subordinate device is able to operate on a channel obtained after channel switching is performed according to the second channel switching manner; and receiving a channel negotiation success response frame that is sent by the network device in the first established network after determining that the subordinate device is able to operate on the channel, and receiving a channel negotiation success response frame that is sent by the network device in the second established network after determining that the subordinate device is unable to operate on the channel; the sending, according to the channel occupancy information, a channel negotiation execution frame that includes a channel switching manner to a network device in at least one established network, includes sending a channel negotiation execution frame that includes the first channel switching manner to the network device in the first established network, where the first channel switching manner is to reduce a bandwidth of two subchannels occupied by the network device in the first established network to a bandwidth of one subchannel occupied, so as to generate an idle subchannel; and the performing a networking operation on the idle channel includes performing the networking operation on the generated idle subchannel.

An embodiment of the present invention further provides another channel negotiation method, including receiving a channel negotiation execution frame that is sent by a network device in a newly established network and includes a channel switching manner; switching a current operating channel according to the channel switching manner to generate an idle channel; and feeding back a channel negotiation execution acknowledgement frame to the network device in the newly established network, so that the network device in the newly established network performs a networking operation on the idle channel.

Further, before the receiving a channel negotiation execution frame that is sent by a network device in a newly established network and includes a channel switching manner, the method further includes receiving a channel negotiation request frame that is sent by the network device in the newly established network and includes the channel switching manner, and determining whether a subordinate device is able to operate on a channel obtained after channel switching is performed according to the channel switching manner; and sending a channel negotiation success response frame to the network device in the newly established network after determining that the subordinate device is able to operate on the channel.

Further, the receiving a channel negotiation execution frame that is sent by a network device in a newly established network and includes a channel switching manner includes receiving the channel negotiation execution frame that is sent by the network device in the newly established network and includes the channel switching manner, adjusting an operating frequency according to the channel switching manner, and adjusting the operating frequency to an operating frequency that belongs to a same channel as that of a network device in an established network.

Further, the receiving a channel negotiation execution frame that is sent by a network device in a newly established network and includes a channel switching manner includes receiving the channel negotiation execution frame that is sent by the network device in the newly established network and includes the channel switching manner; reducing, according to the channel switching manner, a bandwidth of two subchannels occupied to a bandwidth of one subchannel occupied, adjusting an operating frequency with the reduced bandwidth, and adjusting the operating frequency to an operating frequency that belongs to the same channel as that of the network device in the at least one established network or adjusting the operating frequency to an operating frequency at which an idle subchannel is generated.

According to another aspect, an embodiment of the present invention further provides a network device, including an obtaining module configured to obtain channel occupancy information; a negotiation executing module configured to send, according to the channel occupancy information, a channel negotiation execution frame that includes a channel switching manner to a network device in at least one established network, so that the network device in the at least one established network switches a current operating channel according to the channel switching manner to generate an idle channel; and a networking module configured to receive a channel negotiation execution acknowledgement frame fed back by the network device in the at least one established network, and perform a networking operation on the idle channel.

Further, the network device further includes a first negotiation request module configured to send a channel negotiation request frame that includes the channel switching manner to the network device in the at least one established network, so that the network device in the at least one established network determines whether a subordinate device is able to operate on a channel obtained after channel switching is performed according to the channel switching manner; and a first receiving module configured to receive a channel negotiation success response frame that is sent by the network device in the at least one established network after determining that the subordinate device is able to operate on the channel.

Further, the obtaining module is configured to obtain channel occupancy information indicating that two idle subchannels exist in two channels, the two idle subchannels belong to different channels respectively, and two occupied subchannels do not belong to a same established network; and the negotiation executing module is configured to send the channel negotiation execution frame that includes the channel switching manner to the network device in the at least one established network, where the channel switching manner is to adjust an operating frequency of the network device in the at least one established network to an operating frequency that belongs to a same channel.

Further, the obtaining module is configured to obtain channel occupancy information indicating that two idle subchannels exist in four subchannels, where the two idle subchannels belong to different channels respectively, and two occupied subchannels belong to a first established network and a second established network respectively; and the negotiation executing module is configured to send a channel negotiation execution frame that includes a first channel switching manner to a network device in the first established network, and send a channel negotiation execution frame that includes a second channel switching manner to a network device in the second established network, where the first channel switching manner and the second channel switching manner are to adjust an operating frequency of the network device in the first established network and an operating frequency of the network device in the second established network to operating frequencies that belong to a same channel.

Further, the obtaining module is configured to obtain channel occupancy information indicating that one idle subchannel exists in four subchannels, two occupied subchannels of three occupied subchannels belong to a first established network and a remaining occupied subchannel belongs to a second established network; and the negotiation executing module is configured to send a channel negotiation execution frame that includes a first channel switching manner to a network device in the first established network, and send a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to adjust an operating frequency of the network device in the second established network; and the adjusted operating frequency of the network device in the first established network and the adjusted operating frequency of the network device in the second established network are operating frequencies that belong to a same channel.

Further, the obtaining module is configured to obtain channel occupancy information indicating that no idle subchannel exists in four subchannels, two occupied subchannels belong to a first established network, and two other occupied subchannels belong to a second established network; and the negotiating execution module is configured to send a channel negotiation execution frame that includes a first channel switching manner to a network device in the first established network, and send a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to reduce a bandwidth of two subchannels occupied by the network device in the second established network to a bandwidth of one subchannel occupied, and adjust the operating frequency of the network device with the reduced bandwidth; and the adjusted operating frequency of the network device in the first established network and the adjusted operating frequency of the network device in the second established network are operating frequencies that belong to a same channel.

Further, the network device includes a second negotiation request module and a second receiving module, where the obtaining module is configured to obtain channel occupancy information indicating that no idle subchannel exists in four subchannels, two occupied subchannels belong to a first established network, and two other occupied subchannels belong to a second established network; the second negotiation request module is configured to send a channel negotiation request frame that includes a first channel switching manner to a network device in the first established network, so that the network device in the first established network determines whether a subordinate device is able to operate on a channel obtained after channel switching is performed according to the first channel switching manner, and send a channel negotiation request frame that includes a second channel switching manner to a network device in the second established network, so that the network device in the second established network determines whether a subordinate device is able to operate on a channel on which channel switching is performed according to the second channel switching manner; the second receiving module is configured to receive a channel negotiation success response frame that is sent by the network device in the first established network after determining that the subordinate device is able to operate on the channel, and receive a channel negotiation success response frame that is sent by the network device in the second established network after determining that the subordinate device is unable to operate on the channel; the negotiation executing module is configured to send a channel negotiation execution frame that includes the first channel switching manner to the network device in the first established network, where the first channel switching manner is to reduce a bandwidth of two subchannels occupied by the network device in the first established network to a bandwidth of one subchannel occupied, so as to generate an idle subchannel; and the networking module is configured to perform the networking operation on the generated idle subchannel.

An embodiment of the present invention further provides a network device, including a third receiving module configured to receive a channel negotiation execution frame that is sent by a network device in a newly established network and includes a channel switching manner; an executing module configured to switch a current operating channel according to the channel switching manner to generate an idle channel; and a feedback module configured to feed back a channel negotiation execution acknowledgement frame to the network device in the newly established network, so that the network device in the newly established network performs a networking operation on the idle channel.

Further, the foregoing network device includes a determining module configured to receive a channel negotiation request frame that is sent by the network device in the newly established network and includes the channel switching manner, and determine whether a subordinate device is able to operate on a channel obtained after channel switching is performed according to the channel switching manner; and a sending module configured to send a channel negotiation success response frame to the network device in the newly established network after it is determined that the subordinate device is able to operate on the channel.

Further, the third receiving module is configured to receive the channel negotiation execution frame that is sent by the network device in the newly established network and includes the channel switching manner, adjust an operating frequency according to the channel switching manner, and adjust the operating frequency to an operating frequency that belongs to a same channel as that of a network device in an established network.

Further, the third receiving module is configured to receive the channel negotiation execution frame that is sent by the network device in the newly established network and includes the channel switching manner; reduce, according to the channel switching manner, a bandwidth of two subchannels occupied to a bandwidth of one subchannel occupied, adjust an operating frequency with the reduced bandwidth, and adjust the operating frequency to an operating frequency that belongs to the same channel as that of a network device in an established network or adjust the operating frequency to an operating frequency at which an idle subchannel is generated.

According to another aspect, an embodiment of the present invention provides a channel negotiation system, which includes the foregoing two types of network devices.

According to a channel negotiation method, device, and system provided in embodiments of the present invention, channel occupancy information of a network device in an established network is obtained, and a channel negotiation execution frame that includes a channel switching manner is sent to a network device in at least one established network, so that the network device in the at least one established network switches a current operating channel according to the channel switching manner to generate an idle channel. If no idle channel exists, an idle channel can be generated by means of channel switching performed by the network device in the at least one established network; if idle channels are not continuous, continuous idle channels can be generated by means of channel switching performed by the network device in the at least one established network, which not only satisfies a networking requirement of a network device in a newly established network, but also improves a bandwidth utilization ratio and a data transmission rate of the network device in the newly established network.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

In technical solutions of the present invention, a millimeter wave band frequency is not limited to around 60 GHz, but may be around 45 GHz which is compatible with both a 2.16 GHz bandwidth and a 1.08 GHz bandwidth, or may be a millimeter wave band of an entire 20 GHz to 100 GHz band. Embodiments of the present invention relate to a channel negotiation method formed on a basis of further dividing two 2.16 GHz bandwidth channels into four 1.08 GHz bandwidth channels according to Chinese millimeter wave communications standards.

In the technical solutions of the present invention, a network device in an established network may be a mobile device of a basic service set (BSS) architecture or a personal basic service set (PBSS) architecture. The BSS architecture includes a network device in one established network and several mobile stations, where the network device in the established network may be a wireless access device (e.g., an Access Point (AP)), and the mobile stations may be wireless stations (STAs). The network device AP in the established network can create a group of basic services, and bridge plenty of STAs from a wireless network to other existing networks. The PBSS architecture includes several mobile stations, one of which serves as a master mobile station. The one that serves as the master mobile station may be a mobile station that integrates functions of an AP and functions of a mobile station.

Figure 1:
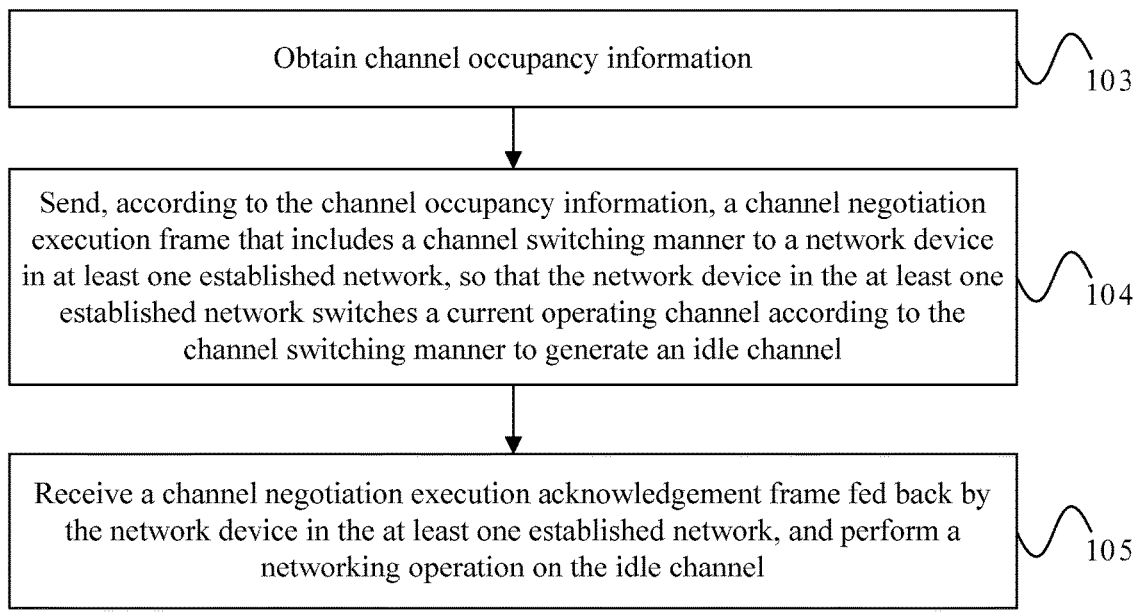
FIG. 1 is a flowchart of Embodiment 1 of a channel negotiation method according to the present invention.

FIG. 1 is a flowchart of Embodiment 1 of a channel negotiation method according to the present invention. This embodiment is implemented by a network device in a newly established network. As shown in FIG. 1, the method according to this embodiment may include the following steps.

Step 103: Obtain channel occupancy information.

A network device in a newly established network may obtain channel occupancy information of a network device in an established network by using a wireless measurement technology, where the channel occupancy information includes channel occupancy information of the network device in the established network and information about an idle channel.

Step 104: Send, according to the channel occupancy information, a channel negotiation execution frame that includes a channel switching manner to a network device in at least one established network, so that the network device in the at least one established network switches a current operating channel according to the channel switching manner to generate an idle channel.

Before networking, the network device in the newly established network may send the channel negotiation execution frame that includes the channel switching manner to the network device in the at least one established network, where the frame is sent according to a specified policy and according to the channel occupancy information of the network device in the established network and a networking requirement of the network device in the newly established network, so that the network device in the at least one established network performs channel switching to generate the idle channel, where a bandwidth of the generated idle channel may be 2.16 GHz or 1.08 GHz.

Step 105: Receive a channel negotiation execution acknowledgement frame fed back by the network device in the at least one established network, and perform a networking operation on the idle channel.

After the network device in the at least one established network performs channel switching, the network device in the at least one established network sends the channel negotiation execution acknowledgement frame to the network device in the newly established network. After receiving the channel negotiation execution acknowledgement frame, the network device in the newly established network can perform the networking operation on the idle channel.

According to the embodiment of the present invention, channel occupancy information of a network device in an established network is obtained, and a channel negotiation execution frame that includes a channel switching manner is sent to a network device in at least one established network, so that the network device in the at least one established network switches a current operating channel according to the channel switching manner to generate an idle channel. If no idle channel exists, an idle channel can be generated by means of channel switching performed by the network device in the established network; if idle channels are not continuous, continuous idle channels can be generated by means of channel switching performed by the network device in the established network, which not only satisfies a networking requirement of a network device in a newly established network, but also improves a bandwidth utilization ratio and a data transmission rate of the network device in the newly established network.

Figure 2:
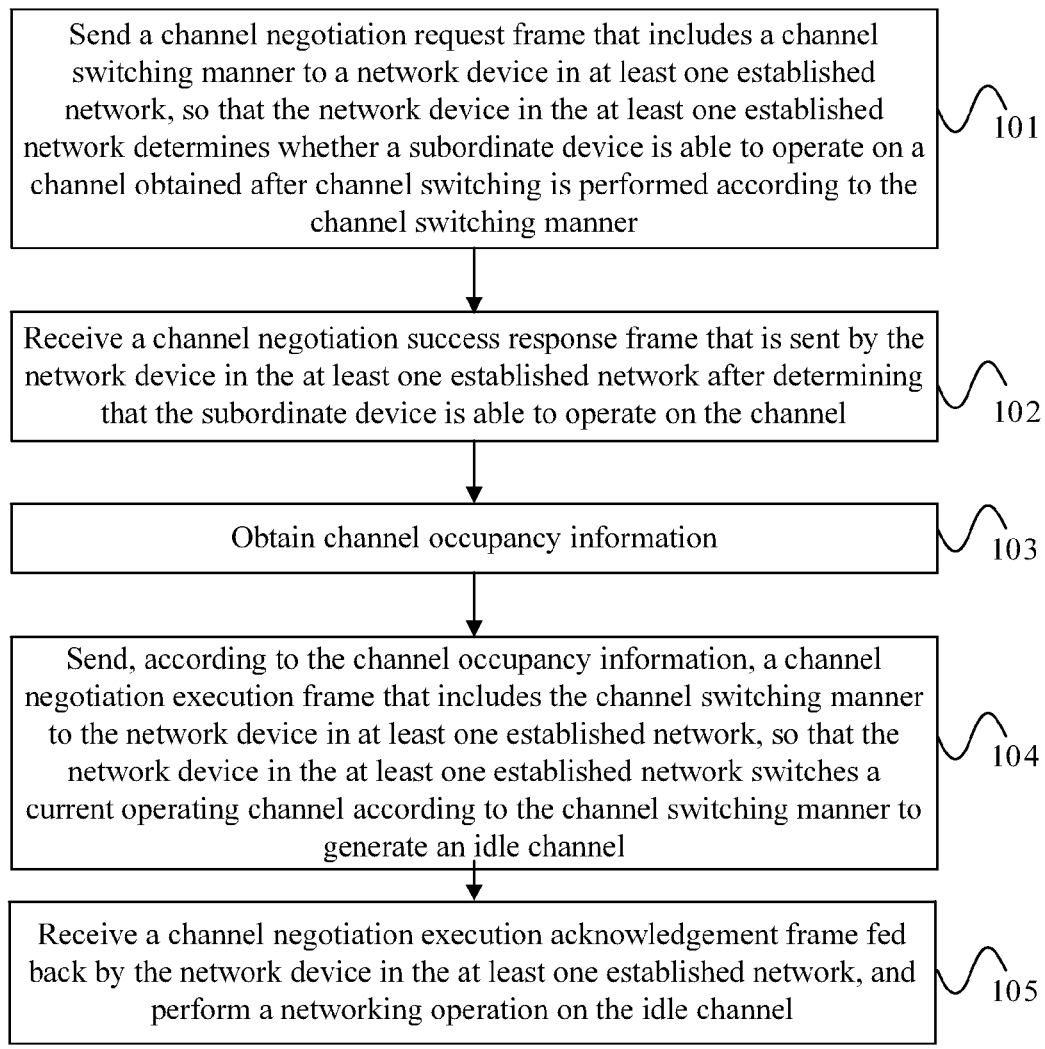
FIG. 2 is a flowchart of Embodiment 2 of a channel negotiation method according to the present invention.

FIG. 2 is a flowchart of Embodiment 2 of a channel negotiation method according to the present invention. As shown in FIG. 2, in a specific implementation process, before the sending a channel negotiation execution frame that includes a channel switching manner to a network device in at least one established network, the method further includes the following steps.

Step 101: Send a channel negotiation request frame that includes the channel switching manner to the network device in the at least one established network, so that the network device in the at least one established network determines whether a subordinate device is able to operate on a channel obtained after channel switching is performed according to the channel switching manner.

Step 102: Receive a channel negotiation success response frame that is sent by the network device in the at least one established network after determining that the subordinate device is able to operate on the channel.

In the embodiment of the present invention, a subordinate device of the network device in the established network is a mobile workstation managed by the network device. The determining, by the network device in the at least one established network, whether a subordinate device is able to operate on a channel obtained after channel switching is performed according to the channel switching manner, includes two manners one manner is the network device in the at least one established network determines, according to a device attribute of the subordinate device, whether the subordinate device is able to operate on the channel obtained after channel switching is performed according to the channel switching manner; and the other manner is the network device in the at least one established network determines, by sending the channel negotiation request frame that includes the channel switching manner to the subordinate device, whether the subordinate device is able to operate on the channel obtained after channel switching is performed according to the channel switching manner. After it is determined that the subordinate device of the network device in the established network is able to operate on the channel obtained after channel switching is performed, a channel negotiation success response frame is sent to the network device in the newly established network.

According to the embodiment of the present invention, a channel negotiation request frame that includes a channel switching manner is sent to a network device in at least one established network, and a channel negotiation success response frame is received, where the frame is sent by the network device in the at least one established network when it is determined that a subordinate device is able to operate on a channel obtained after channel switching is performed, so that the network device in the newly established network can learn a working condition of the network device in the established network.

In the following, several specific embodiments are used to describe the technical solutions of the method embodiment shown in FIG. 1 in detail.

Figure 3:
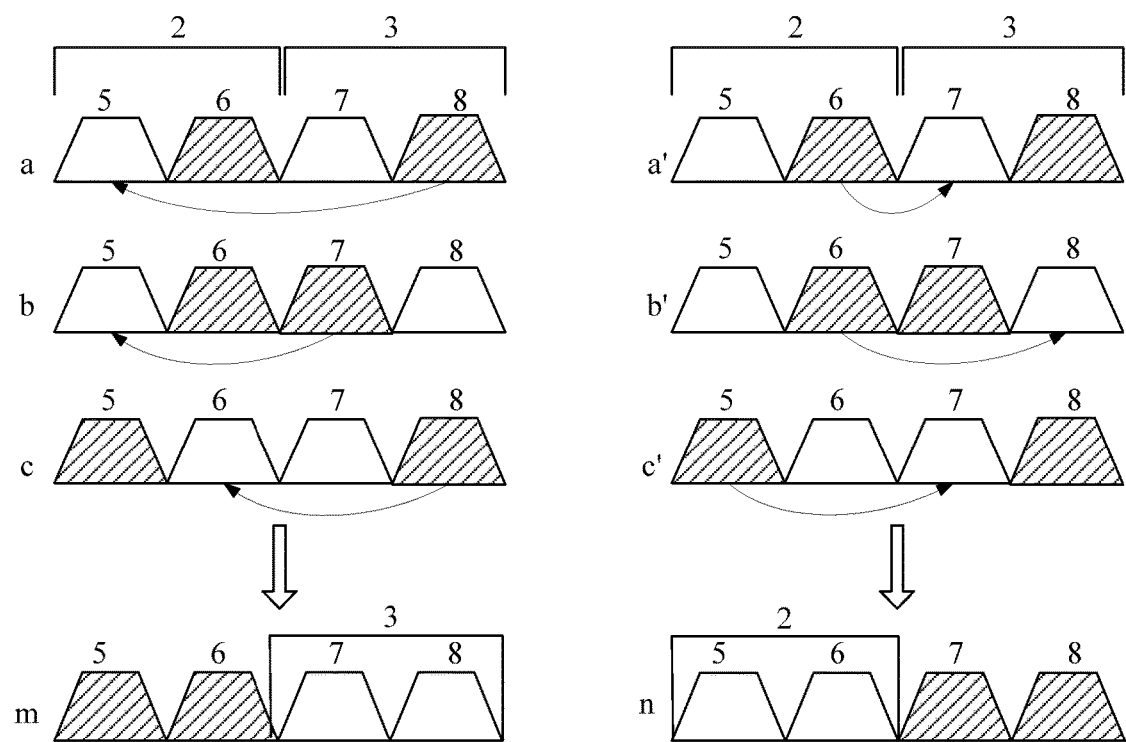
FIG. 3 is a schematic diagram of channel switching in Embodiment 3 of a channel negotiation method according to the present invention.

FIG. 3 is a schematic diagram of channel switching in Embodiment 3 of a channel negotiation method according to the present invention. In a specific implementation process, the obtaining, by a network device in a newly established network, channel occupancy information, includes obtaining channel occupancy information indicating that two idle subchannels exist in two channels, where the two idle subchannels belong to different channels respectively, and two occupied subchannels do not belong to a same established network; and the sending, by the network device in the newly established network according to the channel occupancy information, a channel negotiation execution frame that includes a channel switching manner to a network device in at least one established network, includes sending the channel negotiation execution frame that includes the channel switching manner to the network device in the established network, where the channel switching manner is to adjust an operating frequency of the network device in the established network to an operating frequency that belongs to a same channel. A detailed process is shown in FIG. 3.

In a scenario (a) shown in FIG. 3, a process in which a network device in a newly established network participates in networking by means of channel negotiation includes the following steps.

Step 301: A network device in a newly established network obtains, by using a wireless measurement technology, channel occupancy information indicating that two idle subchannels 5 and 7 exist in two channels 2 and 3 respectively, and two occupied subchannels 6 and 8 do not belong to a same established network.

Step 302: The network device in the newly established network sends, according to the channel occupancy information in the scenario a, a channel negotiation request frame that includes switching a channel from the subchannel 8 to the subchannel 5, to a network device that is already networked on the subchannel 8.

Step 303: After receiving the channel negotiation request frame that is sent by the network device in the newly established network and includes switching the channel from the subchannel 8 to the subchannel 5, the network device that is already networked on the subchannel 8 determines that its subordinate device is able to operate on the subchannel 5, and sends a channel negotiation success response frame, which indicates that the subordinate device is able to operate on the subchannel 5, to the network device in the newly established network.

Step 304: After receiving the channel negotiation success response frame sent by the network device that is already networked on the subchannel 8, the network device in the newly established network sends a channel negotiation execution frame, which indicates that the channel is switched from the subchannel 8 to the subchannel 5, to the network device that is already networked on the subchannel 8, so that an operating frequency of the network device that is already networked on the subchannel 8 is adjusted to an operating frequency that belongs to a same channel 2 as that of the subchannel 6.

Step 305: The network device that is already networked on the subchannel 8 receives the channel negotiation execution frame sent by the network device in the newly established network, and adjusts the operating frequency to an operating frequency that belongs to the same channel 2 as that of the subchannel 6, so that, as shown in a scenario m in FIG. 3, two continuous subchannels 7 and 8, that is, a channel 3 with a bandwidth of 2.16 GHz, are generated.

Step 306: After detecting that the network device in the established network has switched the channel, the network device in the newly established network performs a networking operation on the channel 3, where a networking bandwidth is 2.16 GHz.

In FIG. 3, the scenario b and the scenario c are similar to the scenario a, and two continuous subchannels 7 and 8 in the scenario m may be generated by using the same channel negotiation method as that in the scenario a. Scenarios a', b', and c' are also similar to the scenario a, and two continuous subchannels 5 and 6 in a scenario n, that is, the channel 2, may be generated by using the same channel negotiation method as that in the scenario a. For details of channel negotiation methods in the scenarios b to c and the scenarios a', b', and c', refer to the channel negotiation method in the scenario a in FIG. 3, and no repeated description is provided herein again. In a practical application process, two continuous subchannels can be generated in both the scenario a and the scenario a'. The two scenarios have a same priority, and are not order-sensitive. If either of them succeeds, the channel negotiation may be ended. The embodiment of the present invention is not limited to the foregoing scenarios. All scenarios in which two continuous subchannels are obtained by using the foregoing method shall fall within the protection scope of the present invention. Similar scenarios are not detailed herein again.

According to the embodiment of the present invention, channel occupancy information is obtained, and a channel negotiation execution frame that includes a channel switching manner is sent to a network device in an established network, so that two continuous subchannels can be formed. This overcomes a problem that two discontinuous 1.08 GHz bands in four 1.08 GHz bands are occupied by two working networks, but two idle 1.08 GHz bands are unable to form continuous spectrums, so that a network device in a newly established network which is in accordance with Chinese millimeter wave standards and also compatible with international standards is able to operate in a 2.16 GHz bandwidth state, thereby implementing a higher data transmission rate.

Figure 4:
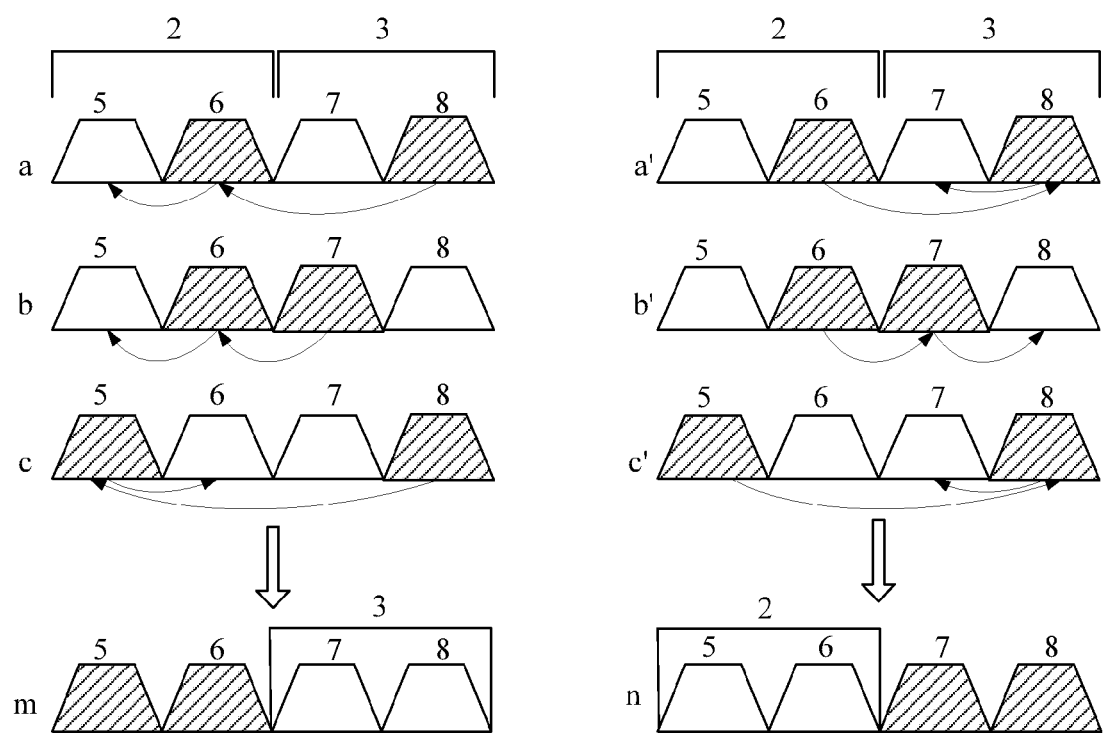
FIG. 4 is a schematic diagram of channel switching in Embodiment 4 of a channel negotiation method according to the present invention.

FIG. 4 is a schematic diagram of channel switching in Embodiment 4 of a channel negotiation method according to the present invention. In the embodiment shown in FIG. 3, when the network device in the established network determines that, due to channel interference, its subordinate device is unable to operate on the channel required by the channel negotiation request frame, channel switching may be performed according to the channel negotiation method shown in FIG. 4. In a specific implementation process, the obtaining, by a network device in a newly established network, channel occupancy information, includes obtaining channel occupancy information indicating that two idle subchannels exist in four subchannels, where the two idle subchannels belong to different channels respectively, and two occupied subchannels belong to a first established network and a second established network respectively; and the sending, by the network device in the newly established network according to the channel occupancy information, a channel negotiation execution frame that includes a channel switching manner to a network device in at least one established network, includes sending a channel negotiation execution frame that includes a first channel switching manner to a network device in the first established network, and sending a channel negotiation execution frame that includes a second channel switching manner to a network device in the second established network, where the first channel switching manner and the second channel switching manner are to adjust an operating frequency of the network device in the first established network and an operating frequency of the network device in the second established network to operating frequencies that belong to a same channel, which is shown in FIG. 4.

In a scenario a shown in FIG. 4, a process in which a network device in a newly established network participates in networking by means of channel negotiation includes the following steps.

Step 401: A network device in a newly established network obtains, by using a wireless measurement technology, channel occupancy information indicating that two idle subchannels 5 and 7 exist in four subchannels, the two idle subchannels 5 and 7 belong to a channel 2 and a channel 3 respectively, and two occupied subchannels 6 and 8 belong to a first established network and a second established network respectively.

Step 402: The network device in the newly established network sends, according to the channel occupancy information in the scenario a, a channel negotiation request frame that includes a first channel switching manner indicating a channel is switched from the subchannel 6 to the subchannel 5, to a network device that is existent in the first established network and already networked on the subchannel 6; and also sends a channel negotiation request frame that includes a second channel switching manner indicating a channel is switched from the subchannel 8 to the subchannel 6, to a network device that is existent in the second established network and already networked on the subchannel 8.

Step 403: The network device in the first established network receives the channel negotiation request frame that is sent by the network device in the newly established network and indicates the channel is switched from the subchannel 6 to the subchannel 5, determines that its subordinate device is able to operate on the subchannel 5, and sends a channel negotiation success response frame, which indicates that its subordinate device is able to operate on the subchannel 5, to the network device in the newly established network; meanwhile, the network device in the second established network receives the channel negotiation request frame that is sent by the network device in the newly established network and indicates that the channel is switched from the subchannel 8 to the subchannel 6, determines that its subordinate device is able to operate on the subchannel 6, and sends a channel negotiation success response frame, which indicates that its subordinate device is able to operate on the subchannel 6, to the network device in the newly established network.

Step 404: After receiving the channel negotiation success response frames sent by the network device in the first established network and the network device in the second established network, the network device in the newly established network sends a channel negotiation execution frame, which indicates that the channel is switched from the subchannel 6 to the subchannel 5, to the network device in the first established network, and sends a channel negotiation execution frame, which indicates that the channel is switched from the subchannel 8 to the subchannel 6, to the network device in the second established network, so that an operating frequency of the network device in the first established network and an operating frequency of the network device in the second established network are adjusted to operating frequencies that belong to a same channel 2.

Step 405: The network device in the first established network receives the channel negotiation execution frame that is sent by the network device in the newly established network and includes the first channel switching manner, and switches the channel from the subchannel 6 to the subchannel 5 according to the channel negotiation execution frame that includes the first channel switching manner; and the network device in the second established network receives the channel negotiation execution frame that is sent by the network device in the newly established network and includes the second channel switching manner, and switches the channel from the subchannel 8 to the subchannel 6 according to the channel negotiation execution frame that includes the second channel switching manner, so that the operating frequency of the network device in the first established network and the operating frequency of the network device in the second established network are adjusted to the operating frequencies that belong to the same channel 2. In a scenario m shown in FIG. 4, two continuous subchannels 7 and 8, that is, a channel 3 with a bandwidth of 2.16 GHz, are generated.

Step 406: After detecting that the network device in the established network has switched the channel, the network device in the newly established network performs a networking operation on the channel 3, where a networking bandwidth is 2.16 GHz.

In FIG. 4, a scenario b and a scenario c are similar to the scenario a, and two continuous subchannels 7 and 8 in the scenario m may be generated by using the same channel negotiation method as that in the scenario a. Scenarios a', b', and c' are also similar to the scenario a, and two continuous subchannels 5 and 6 in a scenario n, that is, the channel 2, may be generated by using the same channel negotiation method as that in the scenario a. For details of channel negotiation methods in the scenarios b to c and the scenarios a', b', and c', refer to the channel negotiation method in the scenario a in FIG. 4, and no repeated description is provided herein again. In a practical application process, two continuous subchannels can be generated in both the scenario a and the scenario a'. The two scenarios have a same priority, and are not order-sensitive. If either of them succeeds, the channel negotiation may be ended. The embodiment of the present invention is not limited to the foregoing scenarios. All scenarios in which two continuous subchannels are obtained by using the foregoing method shall fall within the protection scope of the present invention. Similar scenarios are not detailed herein again.

According to the embodiment of the present invention, channel occupancy information is obtained, a channel negotiation execution frame that includes a first channel switching manner is sent to a network device in a first established network, and a channel negotiation execution frame that includes a second channel switching manner is sent to a network device in a second established network, where the first channel switching manner and the second channel switching manner are to adjust an operating frequency of the network device in the first established network and an operating frequency of the network device in the second established network to operating frequencies that belong to a same channel, so that two continuous subchannels can be formed. This overcomes a problem that two discontinuous 1.08 GHz bands in four 1.08 GHz bands are occupied by two working networks, but two idle 1.08 GHz bands are unable to form continuous spectrums, so that a network device in a newly established network which is in accordance with Chinese millimeter wave standards and also compatible with international standards is able to operate in a 2.16 GHz bandwidth state, thereby implementing a higher data transmission rate.

Figure 5:
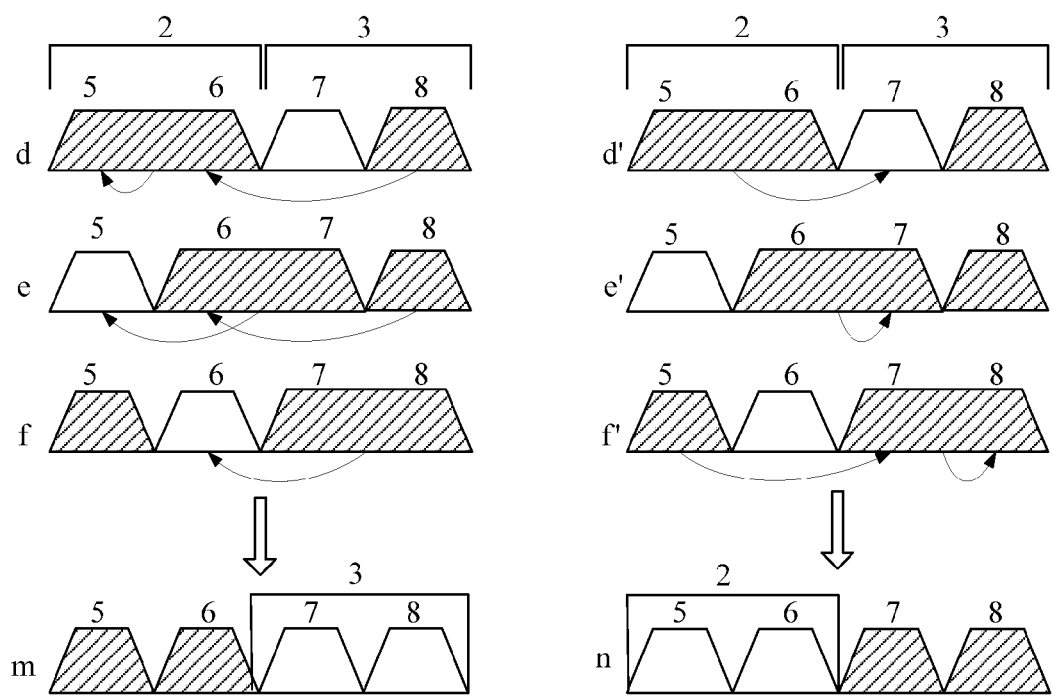
FIG. 5 is a schematic diagram of channel switching in Embodiment 5 of a channel negotiation method according to the present invention.

FIG. 5 is a schematic diagram of channel switching in Embodiment 5 of a channel negotiation method according to the present invention. In a specific implementation process, the obtaining, by a network device in a newly established network, channel occupancy information, includes obtaining channel occupancy information indicating that one idle subchannel exists in four subchannels, two occupied subchannels of three occupied subchannels belong to a first established network and a remaining occupied subchannel belongs to a second established network; and the sending, by the network device in the newly established network according to the channel occupancy information, a channel negotiation execution frame that includes a channel switching manner to a network device in at least one established network, includes sending a channel negotiation execution frame that includes a first channel switching manner to a network device in the first established network, and sending a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to adjust an operating frequency of the network device in the second established network; and the adjusted operating frequency of the network device in the first established network and the adjusted operating frequency of the network device in the second established network are operating frequencies that belong to a same channel. A detailed process is shown in FIG. 5.

In a scenario d shown in FIG. 5, a process in which a network device in a newly established network participates in networking by means of channel negotiation includes the following steps.

Step 501: A network device in a newly established network obtains, by using a wireless measurement technology, channel occupancy information indicating that one idle subchannel 7 and three occupied subchannels 5, 6, and 8 exist in four subchannels, the two occupied subchannels 5 and 6 belong to a first established network and the occupied subchannel 8 belongs to a second established network.

Step 502: The network device in the newly established network sends a channel negotiation request frame that includes a first channel switching manner to a network device in the first established network according to the channel occupancy information in a scenario d, where the first channel switching manner is to reduce a bandwidth of two subchannels 5 and 6 occupied by the network device in the first established network to a bandwidth of one subchannel occupied and adjust an operating frequency of the network device with the reduced bandwidth to the subchannel 5; and also sends a channel negotiation request frame that includes a second channel switching manner to a network device in the second established network, where the second channel switching manner is to switch an operating frequency of the network device in the second established network from the subchannel 8 to the subchannel 6.

Step 503: The network device in the first established network receives the channel negotiation request frame that is sent by the network device in the newly established network and includes the first channel switching manner, determines that its subordinate device is able to operate on the subchannel 5, and sends a channel negotiation success response frame, which indicates that its subordinate device is able to operate on the subchannel 5, to the network device in the newly established network; meanwhile, the network device in the second established network receives the channel negotiation request frame that is sent by the network device in the newly established network and includes the second channel switching manner, determines that its subordinate device is able to operate on the subchannel 6, and sends a channel negotiation success response frame, which indicates that its subordinate device is able to operate on the subchannel 6, to the network device in the newly established network.

Step 504: After receiving the channel negotiation success response frames sent by the network device in the first established network and the network device in the second established network, the network device in the newly established network sends a channel negotiation execution frame, which indicates that a channel is switched from the channel 2 to the subchannel 5, to the network device in the first established network, and sends a channel negotiation execution frame, which indicates that a channel is switched from the subchannel 8 to the subchannel 6, to the network device in the second established network, so that an operating frequency of the network device in the first established network and an operating frequency of the network device in the second established network are adjusted to operating frequencies that belong to a same channel 2.

Step 505: The network device in the first established network receives the channel negotiation execution frame that is sent by the network device in the newly established network and includes the first channel switching manner, and switches the channel from the channel 2 to the subchannel 5 according to the channel negotiation execution frame that includes the first channel switching manner; and the network device in the second established network receives the channel negotiation execution frame that is sent by the network device in the newly established network and includes the second channel switching manner, and switches the channel from the subchannel 8 to the subchannel 6 according to the channel negotiation execution frame that includes the second channel switching manner, so that the operating frequency of the network device in the first established network and the operating frequency of the network device in the second established network are adjusted to the operating frequencies that belong to the same channel 2. In a scenario m shown in FIG. 5, two continuous subchannels 7 and 8, that is, a channel 3 with a bandwidth of 2.16 GHz, are generated.

Step 506: After detecting that the network device in the established network has switched the channel, the network device in the newly established network performs a networking operation on the channel 3, where a networking bandwidth is 2.16 GHz.

In the second switching manner, adjusting the operating frequency of the network device in the second established network may also be keeping an operating frequency of the network device in the second established network unchanged to make the network device operate at an original operating frequency, as shown in scenarios f and d' in FIG. 5.

In FIG. 5, a scenario e is similar to a scenario d, and two continuous subchannels 7 and 8 in the scenario m may be generated by using the same channel negotiation method as that in the scenario a. A scenario f is also similar to the scenario a, and two continuous subchannels 5 and 6 in a scenario n, that is, the channel 2, may be generated by using the same channel negotiation method as that in the scenario a. For details of channel negotiation methods in the scenarios e, d, and f, refer to the channel negotiation method in the scenario d in FIG. 5, and no repeated description is provided herein again. In a practical application process, two continuous subchannels can be generated in both the scenario d and the scenario d'. The two scenarios have a same priority, and are not order-sensitive. If either of them succeeds, the channel negotiation may be ended. The embodiment of the present invention is not limited to the foregoing scenarios. All scenarios in which two continuous subchannels are obtained by using the foregoing method shall fall within the protection scope of the present invention. Similar scenarios are not detailed herein again.

According to the embodiment of the present invention, channel occupancy information is obtained, a channel negotiation execution frame that includes a first channel switching manner is sent to a network device in a first established network, and a channel negotiation execution frame that includes a second channel switching manner is sent to a network device in a second established network, where the first channel switching manner and the second channel switching manner are to adjust an operating frequency of the network device in the first established network and an operating frequency of the network device in the second established network to operating frequencies that belong to a same channel, so that two continuous subchannels can be formed. This overcomes a problem that two discontinuous 1.08 GHz bands in four 1.08 GHz bands are occupied by two working networks, but two idle 1.08 GHz bands are unable to form continuous spectrums, so that a network device in a newly established network which is in accordance with Chinese millimeter wave standards and also compatible with international standards is able to operate in a 2.16 GHz bandwidth state, thereby implementing a higher data transmission rate.

Figure 6:
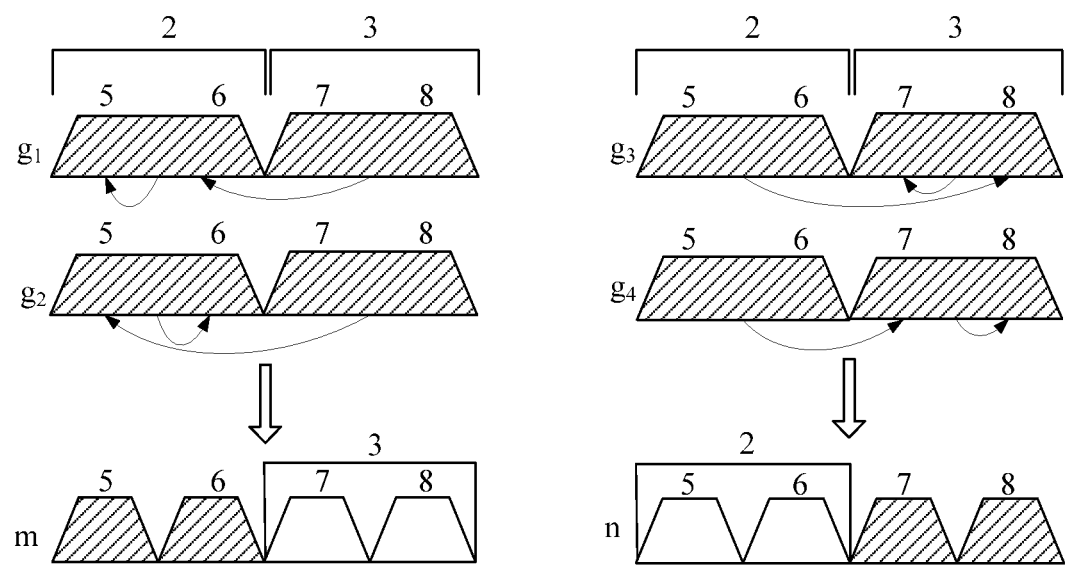
FIG. 6 is a schematic diagram of channel switching in Embodiment 6 of a channel negotiation method according to the present invention.

FIG. 6 is a schematic diagram of channel switching in Embodiment 6 of a channel negotiation method according to the present invention. In a specific implementation process, the obtaining, by a network device in a newly established network, channel occupancy information, includes obtaining channel occupancy information indicating that no idle subchannel exists in four subchannels, two occupied subchannels belong to a first established network, and two other occupied subchannels belong to a second established network; and the sending, by the network device in the newly established network according to the channel occupancy information, a channel negotiation execution frame that includes a channel switching manner to a network device in at least one established network, includes sending a channel negotiation execution frame that includes a first channel switching manner to a network device in the first established network, and sending a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to reduce a bandwidth of two subchannels occupied by the network device in the second established network to a bandwidth of one subchannel occupied, and adjust the operating frequency of the network device with the reduced bandwidth; and the adjusted operating frequency of the network device in the first established network and the adjusted operating frequency of the network device in the second established network are operating frequencies that belong to a same channel. A detailed process is shown in FIG. 6.

In a scenario $g_1$ shown in FIG. 6, a process in which a network device in a newly established network participates in networking by means of channel negotiation includes the following steps.

Step 601: A network device in a newly established network obtains, by using a wireless measurement technology, channel occupancy information indicating that no idle subchannel exists, two occupied subchannels 5 and 6 belong to a first established network, and two other occupied subchannels 7 and 8 belong to a second established network.

Step 602: The network device in the newly established network sends a channel negotiation execution frame that includes a first channel switching manner to a network device in the first established network according to the channel occupancy information in the scenario $g_1$, where the first channel switching manner is to reduce a bandwidth of two subchannels 5 and 6 occupied by the network device in the first established network to a bandwidth of one subchannel occupied, and adjust an operating frequency of the network device with the reduced bandwidth to the subchannel 5; and also sends a channel negotiation execution frame that includes a second channel switching manner to a network device in the second established network, where the second channel switching manner is to reduce a bandwidth of two subchannels 7 and 8 occupied by the network device in the second established network to a bandwidth of one subchannel occupied, and adjust an operating frequency of the network device with the reduced bandwidth to the subchannel 6.

Step 603: The network device in the first established network receives the channel negotiation request frame that is sent by the network device in the newly established network and includes the first channel switching manner, determines that its subordinate device is able to operate on the subchannel 5, and sends a channel negotiation success response frame, which indicates that its subordinate device is able to operate on the subchannel 5, to the network device in the newly established network; meanwhile, the network device in the second established network receives the channel negotiation request frame that is sent by the network device in the newly established network and includes the second channel switching manner, determines that its subordinate device is able to operate on the subchannel 6, and sends a channel negotiation success response frame, which indicates that its subordinate device is able to operate on the subchannel 6, to the network device in the newly established network.

Step 604: After receiving the channel negotiation success response frames sent by the network device in the first established network and the network device in the second established network, the network device in the newly established network sends a channel negotiation execution frame, which indicates that a channel is switched from the channel 2 to the subchannel 5, to the network device in the first established network, and sends a channel negotiation execution frame, which indicates that a channel is switched from the channel 3 to the subchannel 6, to the network device in the second established network, so that an operating frequency of the network device in the first established network and an operating frequency of the network device in the second established network are adjusted to operating frequencies that belong to a same channel 2.

Step 605: The network device in the first established network receives the channel negotiation execution frame that is sent by the network device in the newly established network and includes the first channel switching manner, and switches the channel from the channel 2 to the subchannel 5 according to the channel negotiation execution frame that includes the first channel switching manner; and the network device in the second established network receives the channel negotiation execution frame that is sent by the network device in the newly established network and includes the second channel switching manner, and switches the channel from the channel 3 to the subchannel 6 according to the channel negotiation execution frame that includes the second channel switching manner, so that the operating frequency of the network device in the first established network and the operating frequency of the network device in the second established network are adjusted to the operating frequencies that belong to the same channel 2. In the scenario m shown in FIG. 5, two continuous subchannels 7 and 8, that is, a channel 3 with a bandwidth of 2.16 GHz, are generated.

Step 606: After detecting that the network device in the established network has switched the channel, the network device in the newly established network performs a networking operation on the channel 3, where a networking bandwidth is 2.16 GHz.

In FIG. 6, a scenario $g_2$ is similar to the scenario $g_1$, and two continuous subchannels 7 and 8 in a scenario m may be generated by using the same channel negotiation method as that in the scenario $g_1$. A scenario $g_3$ and a scenario $g_4$ are also similar to the scenario $g_1$, and two continuous subchannels 5 and 6 in a scenario n, that is, the channel 2, may be generated by using the same channel negotiation method as that in the scenario $g_1$. For details of channel negotiation methods in the scenarios $g_2$ to $g_4$, refer to the channel negotiation method in the scenario $g_1$ in FIG. 6, and no repeated description is provided herein again. In a practical application process, two continuous subchannels can be generated in the scenario $g_1$ to the scenario $g_4$. In all the scenarios, channel negotiation has a same priority, and is not order-sensitive. If one of them succeeds, the channel negotiation may be ended. The embodiment of the present invention is not limited to the foregoing scenarios. All scenarios in which two continuous subchannels are obtained by using the foregoing method shall fall within the protection scope of the present invention. Similar scenarios are not detailed herein again.

According to the embodiment of the present invention, channel occupancy information is obtained, a channel negotiation execution frame that includes a first channel switching manner is sent to a network device in a first established network, and a channel negotiation execution frame that includes a second channel switching manner is sent to a network device in a second established network, where the first channel switching manner and the second channel switching manner are to adjust an operating frequency of the network device in the first established network and an operating frequency of the network device in the second established network to operating frequencies that belong to a same channel, so that two continuous subchannels can be formed. This overcomes a problem that two discontinuous 1.08 GHz bands in four 1.08 GHz bands are occupied by two working networks, but two idle 1.08 GHz bands are unable to form continuous spectrums, so that a network device in a newly established network which is in accordance with Chinese millimeter wave standards and also compatible with international standards is able to operate in a 2.16 GHz bandwidth state, thereby implementing a higher data transmission rate.

Figure 7:
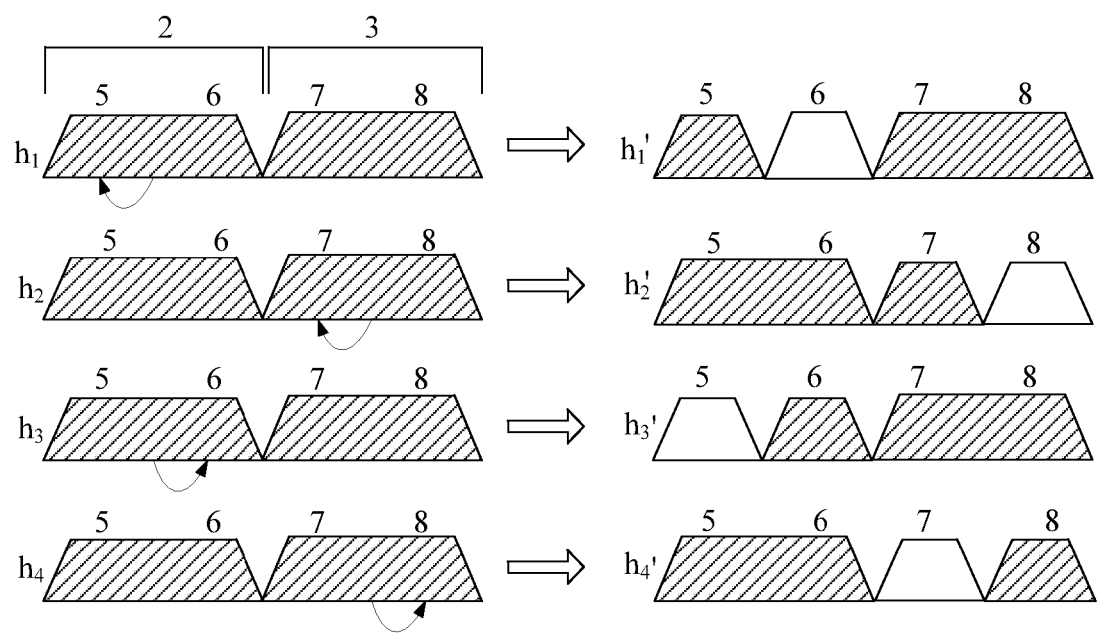
FIG. 7 is a schematic diagram of channel switching in Embodiment 7 of a channel negotiation method according to the present invention.

FIG. 7 is a schematic diagram of channel switching in Embodiment 7 of a channel negotiation method according to the present invention. When the network device in the second established network in FIG. 6 determines that the subordinate device is unable to operate on the channel obtained after channel switching is performed according to the second channel manner, channel switching may be performed according to the method shown in FIG. 7. In a specific implementation process, the obtaining, by a network device in a newly established network, channel occupancy information, includes obtaining channel occupancy information indicating that no idle subchannel exists in four subchannels, two occupied subchannels belong to a first established network, and two other occupied subchannels belong to a second established network.

Before the sending, by the network device in the newly established network according to the channel occupancy information, a channel negotiation execution frame that includes a channel switching manner to a network device in at least one established network, the method further includes sending a channel negotiation request frame that includes a first channel switching manner to a network device in the first established network, so that the network device in the first established network determines whether a subordinate device is able to operate on a channel obtained after channel switching is performed according to the first channel switching manner, and sending a channel negotiation request frame that includes a second channel switching manner to a network device in the second established network, so that the network device in the second established network determines whether a subordinate device is able to operate on a channel obtained after channel switching is performed according to the second channel switching manner; and receiving a channel negotiation success response frame that is sent by the network device in the first established network after determining that the subordinate device is able to operate on the channel, and receiving a channel negotiation success response frame that is sent by the network device in the second established network after determining that the subordinate device is unable to operate on the channel.

The sending, by the network device in the newly established network according to the channel occupancy information, a channel negotiation execution frame that includes a channel switching manner to a network device in at least one established network, includes sending a channel negotiation execution frame that includes the first channel switching manner to the network device in the first established network, where the first channel switching manner is to reduce a bandwidth of two subchannels occupied by the network device in the first established network to a bandwidth of one subchannel occupied, so as to generate an idle subchannel.

In a scenario $h_1$ shown in FIG. 7, a process in which a network device in a newly established network participates in networking by means of channel negotiation includes the following steps.

Step 701: A network device in a newly established network obtains, by using a wireless measurement technology, channel occupancy information indicating that no idle subchannel exists, two occupied subchannels 5 and 6 belong to a first established network, and two other occupied subchannels 7 and 8 belong to a second established network.

Step 702: The network device in the newly established network sends a channel negotiation execution frame that includes a first channel switching manner to a network device in a first established network according to the channel occupancy information in the scenario $h_1$, where the first channel switching manner is to reduce a bandwidth of two subchannels 5 and 6 occupied by the network device in the first established network to a bandwidth of one subchannel occupied, and adjust an operating frequency of the network device with the reduced bandwidth to the subchannel 5; and also sends a channel negotiation execution frame that includes a second channel switching manner to a network device in a second established network, where the second channel switching manner is to reduce a bandwidth of two subchannels 7 and 8 occupied by the network device in the second established network to a bandwidth of one subchannel occupied, and adjust an operating frequency of the network device with the reduced bandwidth to the subchannel 6.

Step 703: The network device in the first established network receives a channel negotiation request frame that is sent by the network device in the newly established network and includes the first channel switching manner, determines that its subordinate device is able to operate on the subchannel 5, and sends a channel negotiation success response frame, which indicates that its subordinate device is able to operate on the subchannel 5, to the network device in the newly established network; meanwhile, the network device in the second established network receives a channel negotiation request frame that is sent by the network device in the newly established network and includes the second channel switching manner, determines that its subordinate device is unable to operate on the subchannel 6, and sends a channel negotiation success response frame, which indicates that its subordinate device is unable to operate on the subchannel 6, to the network device in the newly established network.

Step 704: After receiving the channel negotiation success response frames sent by the network device in the first established network and the network device in the second established network, the network device in the newly established network sends a channel negotiation execution frame, which indicates that a channel is switched from the channel 2 to the subchannel 5, to the network device in the first established network.

Step 705: The network device in the first established network receives the channel negotiation execution frame that is sent by the network device in the newly established network and includes the first channel switching manner, and switches the channel from the channel 2 to the subchannel 5 according to the channel negotiation execution frame that includes the first channel switching manner, and finally, a subchannel 6 with a bandwidth of 1.08 GHz is generated.

Step 706: After detecting that the network device in the established network has switched the channel, the network device in the newly established network performs a networking operation on the subchannel 6.

In FIG. 7, scenarios $h_2$ to $h_4$ are similar to the scenario $h_1$, and one subchannel in the scenarios $h_{2'}$ to $h_{4'}$ may be generated by using the same channel negotiation method as that in the scenario $h_1$. For details of channel negotiation methods in the scenarios $h_2$ to $h_4$, refer to the channel negotiation method in the scenario $h_1$ in FIG. 7, and no repeated description is provided herein again. In a practical application process, two continuous subchannels can be generated in the scenario $h_1$ to the scenario $h_4$. In all the scenarios, channel negotiation has a same priority, and is not order-sensitive. If one of them succeeds, the channel negotiation may be ended. The embodiment of the present invention is not limited to the foregoing scenarios. All scenarios in which two continuous subchannels are obtained by using the foregoing method shall fall within the protection scope of the present invention. Similar scenarios are not detailed herein again.

In the embodiment of the present invention, channel occupancy information is obtained, a channel negotiation request frame that includes a first channel switching manner is sent to a network device in a first established network, so that the network device in the first established network performs channel switching according to the first channel switching manner to generate an idle channel. Therefore, if no idle is available for networking, a network device in a newly established network may use the channel negotiation method to perform networking on the idle channel, which not only solves a problem that the network device in the newly established network cannot participate in networking, but also improves a bandwidth utilization ratio.

Figure 8:
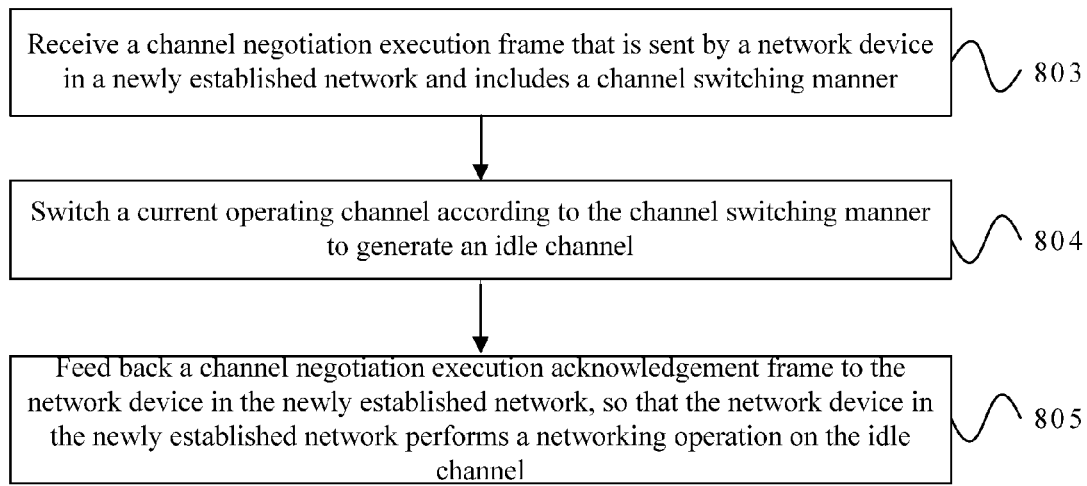
FIG. 8 is a flowchart of Embodiment 8 of a channel negotiation method according to the present invention.

FIG. 8 is a flowchart of Embodiment 8 of a channel negotiation method according to the present invention. This embodiment is implemented by a network device in an established network. As shown in FIG. 8, the method according to this embodiment may include the following steps.

Step 803: Receive a channel negotiation execution frame that is sent by a network device in a newly established network and includes a channel switching manner.

Step 804: Switch a current operating channel according to the channel switching manner to generate an idle channel.

Step 805: Feed back a channel negotiation execution acknowledgement frame to the network device in the newly established network, so that the network device in the newly established network performs a networking operation on the idle channel.

A network device in an established network receives the channel negotiation execution frame that is sent by the network device in the newly established network and includes the channel switching manner, performs channel switching according to the channel switching manner to generate the idle channel, and feeds back the channel negotiation execution acknowledgement frame to the network device in the newly established network, so that the network device in the newly established network can perform the networking operation on the idle channel.

In the embodiment of the present invention, a network device in an established network performs channel switching according to a channel switching manner to generate an idle channel. If no idle channel exists, an idle channel can be generated by means of channel switching performed by the network device in the established network; if idle channels are not continuous, continuous idle channels can be generated by means of channel switching performed by the network device in the established network, which not only satisfies a networking requirement of a network device in a newly established network, but also improves a bandwidth utilization ratio and a data transmission rate.

Figure 9:
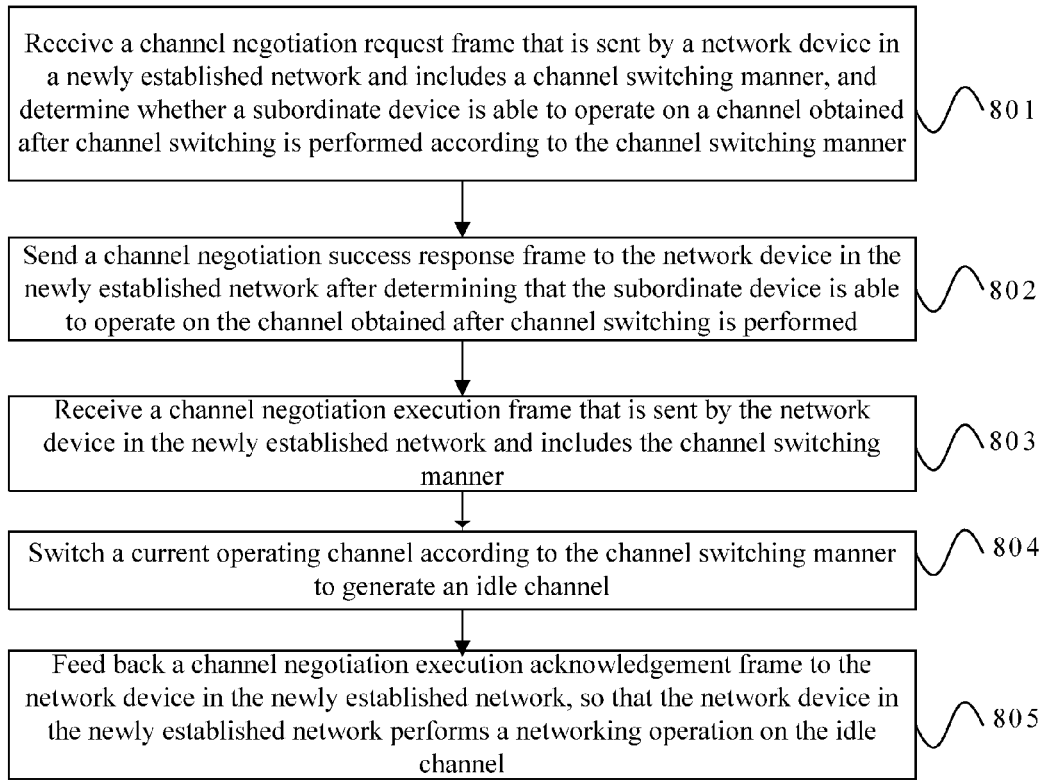
FIG. 9 is a flowchart of Embodiment 9 of a channel negotiation method according to the present invention.

FIG. 9 is a flowchart of Embodiment 9 of a channel negotiation method according to the present invention. As shown in FIG. 9, in the foregoing negotiation method, before a network device in an established network receives a channel negotiation execution frame that is sent by a network device in a newly established network and includes a channel switching manner, the method further includes the following steps.

Step 801: Receive a channel negotiation request frame that is sent by a network device in a newly established network and includes a channel switching manner, and determine whether a subordinate device is able to operate on a channel obtained after channel switching is performed according to the channel switching manner.

Step 802: Send a channel negotiation success response frame to the network device in the newly established network after determining that the subordinate device is able to operate on the channel obtained after the channel switching is performed.

In a specific implementation process, while the network device in the established network is in normal service time, whenever several beacon intervals elapse, the network device in the established network works in a 2.16 GHz bandwidth mode periodically for a short period of time. Meanwhile, in this mode, the network device in the established network sends notification time of operating frequency indication information to its subordinate device. Within the notification time, the network device in the established network receives a channel negotiation request frame that is sent by the network device in the newly established network and includes a channel switching manner, and determines whether the subordinate device is able to operate on a channel obtained after channel switching is performed according to the channel switching manner. The determining may be determining whether the subordinate device of the network device in the established network can perform channel switching, or the network device in the established network performs a bandwidth requirement evaluation to determine whether the subordinate device of the network device in the established network can reduce the bandwidth and switch the channel.

In the embodiment of the present invention, it is determined whether the subordinate device is able to operate on the channel obtained after channel switching is performed according to the channel switching manner, a connection between the network device in the established network and the subordinate device is established within the notification time, and the network device in the established network may send channel switching information to the subordinate device within the notification time so that the subordinate device of the established network can learn the channel switching information.

In the following, several specific embodiments are used to describe in detail the technical solution of the method embodiment shown in FIG. 7 after the network device in the established network determines that the subordinate device is able to operate on the channel obtained after channel switching is performed according to the channel switching manner.

Optionally, the receiving, by the network device in the established network, a channel negotiation execution frame that is sent by a network device in a newly established network and includes a channel switching manner, includes receiving the channel negotiation execution frame that is sent by the network device in the newly established network and includes the channel switching manner, adjusting an operating frequency according to the channel switching manner, and adjusting the operating frequency to an operating frequency that belongs to a same channel as that of a network device in an established network.

In a specific implementation process, when two idle subchannels exist in two channels, where the two idle subchannels belong to different channels respectively, and two occupied subchannels do not belong to channels of a same established network, or when two idle subchannels exist in four subchannels, where the two idle subchannels belong to different channels respectively, and two occupied subchannels belong to a channel of a first established network and a channel of a second established network respectively, the network device in the established network receives the channel negotiation execution frame that is sent by the network device in the newly established network and includes the channel switching manner, and adjusts an operating frequency according to the channel switching manner. The adjusted operating frequency can belong to a same channel as that of a network device in another established network, so that two continuous subchannels can be generated.

In the embodiment of the present invention, a network device in an established network adjusts, according to a channel switching manner, an operating frequency to an operating frequency that belongs to a same channel as that of the network device in the established network, so that two continuous subchannels can be generated. This overcomes a problem that two discontinuous 1.08 GHz bands in four 1.08 GHz bands are occupied by two working networks, but two idle 1.08 GHz bands are unable to form continuous spectrums, so that a network device in a newly established network which is in accordance with Chinese millimeter wave standards and also compatible with international standards is able to operate in a 2.16 GHz bandwidth state, thereby implementing a higher data transmission rate.

Optionally, the receiving, by the network device in the established network, a channel negotiation execution frame that is sent by a network device in a newly established network and includes a channel switching manner, includes receiving, by the network device in the established network, the channel negotiation execution frame that is sent by the network device in the newly established network and includes the channel switching manner; reducing, according to the channel switching manner, a bandwidth of two subchannels occupied to a bandwidth of one subchannel occupied, adjusting an operating frequency with the reduced bandwidth, and adjusting the operating frequency to an operating frequency that belongs to the same channel as that of the network device in the established network or adjusting the operating frequency to an operating frequency at which an idle subchannel is generated.

In a specific implementation process, when one idle subchannel exists in four subchannels, two occupied subchannels of three occupied subchannels belong to a channel of a first established network, and the remaining subchannel belongs to a channel of a second established network; or when no idle subchannel exists in four subchannels, two occupied subchannels belong to a channel of a first established network and the remaining two occupied subchannels belong to a channel of a second established network, the network device in the established network receives the channel negotiation execution frame that is sent by the network device in the newly established network and includes the channel switching manner, reduces, according to the channel switching manner, a bandwidth of the two subchannels occupied to a bandwidth of one subchannel occupied, and adjusts an operating frequency with the reduced bandwidth, where the operating frequency may be adjusted to an operating frequency that belongs to a same channel as that of the network device in the established network which has undergone the same adjustment; or reduces, according to the switching manner, a bandwidth to a bandwidth of one subchannel occupied, and adjusts an operating frequency with the reduced bandwidth so as to generate a subchannel.

In the embodiment of the present invention, a network device in an established network reduces, according to a channel switching manner, a bandwidth of two subchannels occupied to a bandwidth of one subchannel occupied, and adjusts an operating frequency with the reduced bandwidth to an operating frequency that belongs to a same channel as that of a network device in an established network which has undergone the same channel switching, so that two continuous subchannels can be generated. This overcomes a problem that two discontinuous 1.08 GHz bands in four 1.08 GHz bands are occupied by two working networks, but two idle 1.08 GHz bands are unable to form continuous spectrums, so that a network device in a newly established network which is in accordance with Chinese millimeter wave standards and also compatible with international standards is able to operate in a 2.16 GHz bandwidth state, thereby implementing a higher data transmission rate. Alternatively, the network device in the established network reduces, according to a switching manner, a bandwidth to a bandwidth of one subchannel occupied, and adjusts an operating frequency with the reduced bandwidth to generate one subchannel. In this way, if no idle channel is available for networking, a network device in a newly established network can use this channel negotiation method to perform networking on an idle channel, which not only solves a problem that the network device in the newly established network is unable to participate in networking, but also improves a bandwidth utilization ratio.

In the foregoing method embodiments, a channel negotiation process may be implemented by using the foregoing channel negotiation execution frame, the channel execution acknowledgement frame, the channel negotiation request frame, and the channel negotiation success response frame. The foregoing four types of channel negotiation frames may be channel negotiation frame types that are newly added in an Action frame subtype of an Institute of Electrical and Electronics Engineers (IEEE) 802.11 management frame. A length of an Action frame type field is 8 bits, and 256 types may be defined. Currently 20 types have been defined in 802.11 and 802.11ad, and the channel negotiation frames are defined as the $21^{st}$ (binary 00010101) type of Action type frame. Table 1 presents a channel negotiation frame type. Refer to Table 1.

In Table 1, the field of the channel number of the newly established network denotes a number of a channel that the network device in the newly established network expects to use; the field of the original channel number of the existing network denotes a number of a channel currently used by the network device in the established network; and the field of the new channel number of the existing network denotes a number of a new channel that the network device in the newly established network requests the network device in the established network to operate on. The foregoing channel number values are decimal 2, 3, 5, 6, 7, and 8, and correspond to channel numbers in spectrum assignment. The response value field denotes a feedback made by the network device in the established network in response to a channel negotiation request of the network device in the newly established network. When the channel negotiation frame type field is 00000001, which indicates that the frame type is a channel negotiation success response frame, a response value 00000000 indicates that the network device in the established network refuses to change an operating channel; and a response value 00000001 indicates that the network device in the established network agrees to change the operating channel. When the channel negotiation frame type field is not 00000001, the field is ignored, and a default value is all 0. The reserved field is 16 bits, which are all 0.

Figure 10:
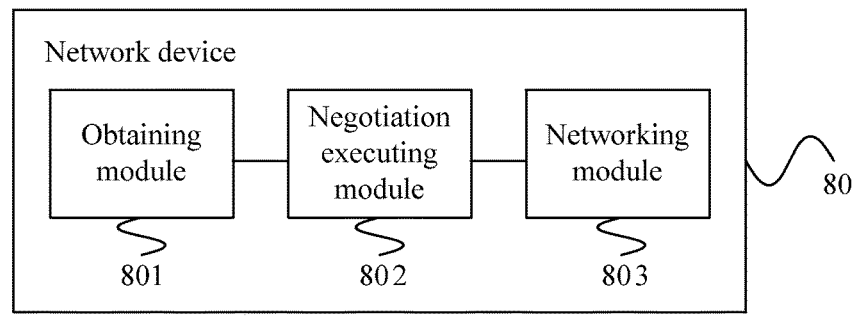
FIG. 10 is a schematic structural diagram of Embodiment 1 of a network device according to the present invention.

FIG. 10 is a schematic structural diagram of Embodiment 1 of a network device according to the present invention. As shown in FIG. 10, a network device 80 provided in the embodiment of the present invention includes an obtaining module 801, a negotiation executing module 802, and a networking module 803. The obtaining module 801 is configured to obtain channel occupancy information; the negotiation executing module 802 is configured to send, according to the channel occupancy information, a channel negotiation execution frame that includes a channel switching manner to a network device in at least one established network, so that the network device in the at least one established network switches a current operating channel according to the channel switching manner to generate an idle channel; and the networking module 803 is configured to receive a channel negotiation execution acknowledgement frame fed back by the network device in the at least one established network, and perform a networking operation on the idle channel.

The network device in this embodiment may be configured to implement the technical solution in the method embodiment shown in FIG. 1. Implementation principles and technical effects of the network device in this embodi-

TABLE 1

| Action frame type | Channel negotiation frame type field | Channel number of a newly established network | Original channel number of an existing network | New channel number of an existing network | Response value | Reserved |
|---|---|---|---|---|---|---|
| 00010101 | 8-bit | 8-bit | 8-bit | 8-bit | 8-bit | 16-bit |

The length of the Action frame type field is 8 bits, and a binary 00010101 (decimal 21) indicates that the Action frame type is a channel negotiation frame. In the channel negotiation frame type field, 00000000 represents a channel negotiation request frame, 00000001 represents a channel negotiation success response frame, 00000010 represents a channel negotiation execution frame, and 00000011 represents a channel negotiation execution acknowledgement frame.

ment are similar to those of the method embodiment, and details are not repeated herein again.

Figure 11:
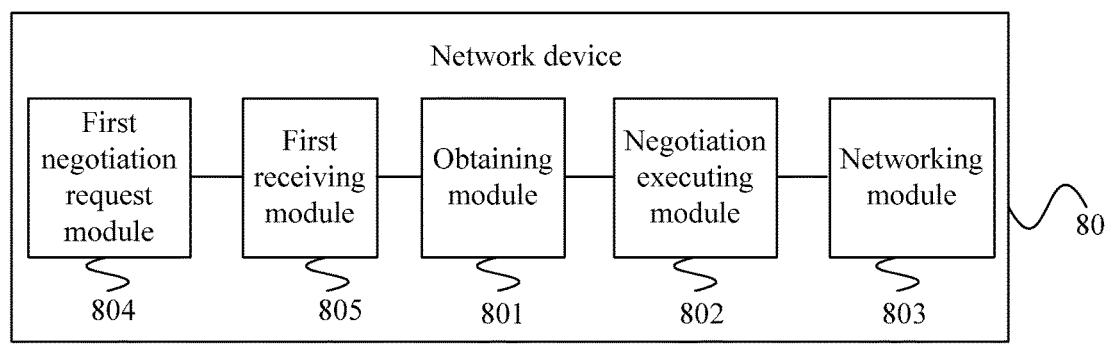
FIG. 11 is a schematic structural diagram of Embodiment 2 of a network device according to the present invention.

FIG. 11 is a schematic structural diagram of Embodiment 2 of a network device according to the present invention. As shown in FIG. 11, on the basis of the embodiment of the network device shown in FIG. 10 according to the present invention, further, the network device 80 further includes a first negotiation request module 804 and a first receiving module 805. The first negotiation request module 804 is configured to send a channel negotiation request frame that includes the channel switching manner to the network device in the at least one established network, so that the network device in the at least one established network determines whether a subordinate device is able to operate on a channel obtained after channel switching is performed according to the channel switching manner; and the first receiving module 805 is configured to receive a channel negotiation success response frame that is sent by the network device in the at least one established network after determining that the subordinate device is able to operate on the channel.

The network device in this embodiment may be configured to implement the technical solution in the method embodiment shown in FIG. 2. Implementation principles and technical effects of the network device in this embodiment are similar to those of the method embodiment, and details are not repeated herein again.

In the following, several specific embodiments are used to describe in detail the technical solutions of embodiments of the network device shown in FIG. 10 and FIG. 11.

Optionally, in the network device 80 shown in FIG. 10, the obtaining module 801 is configured to obtain channel occupancy information indicating that two idle subchannels exist in two channels, where the two idle subchannels belong to different channels respectively, and two occupied subchannels do not belong to a same established network; and the negotiation executing module 802 is configured to send the channel negotiation execution frame that includes the channel switching manner to the network device in the established network, where the channel switching manner is to adjust an operating frequency of the network device in the established network to an operating frequency that belongs to a same channel.

The network device in this embodiment may be configured to implement the technical solution in the method embodiment shown in FIG. 3. Implementation principles and technical effects of the network device in this embodiment are similar to those of the method embodiment, and details are not repeated herein again.

Optionally, in the network device 80 shown in FIG. 10, the obtaining module 801 is configured to obtain channel occupancy information indicating that two idle subchannels exist in four subchannels, where the two idle subchannels belong to different channels respectively, and two occupied subchannels belong to a first established network and a second established network respectively; and the negotiation executing module 802 is configured to send a channel negotiation execution frame that includes a first channel switching manner to a network device in the first established network, and send a channel negotiation execution frame that includes a second channel switching manner to a network device in the second established network, where the first channel switching manner and the second channel switching manner are to adjust an operating frequency of the network device in the first established network and an operating frequency of the network device in the second established network to operating frequencies that belong to a same channel.

The network device in this embodiment may be configured to implement the technical solution in the method embodiment shown in FIG. 4. Implementation principles and technical effects of the network device in this embodiment are similar to those of the method embodiment, and details are not repeated herein again.

Optionally, in the network device 80 shown in FIG. 10, the obtaining module 801 is configured to obtain channel occupancy information indicating that one idle subchannel exists in four subchannels, two occupied subchannels of three occupied subchannels belong to a first established network and a remaining occupied subchannel belongs to a second established network; and the negotiation executing module 802 is configured to send a channel negotiation execution frame that includes a first channel switching manner to a network device in the first established network, and send a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to adjust an operating frequency of the network device in the second established network; and the adjusted operating frequency of the network device in the first established network and the adjusted operating frequency of the network device in the second established network are operating frequencies that belong to a same channel.

The network device in this embodiment may be configured to implement the technical solution in the method embodiment shown in FIG. 5. Implementation principles and technical effects of the network device in this embodiment are similar to those of the method embodiment, and details are not repeated herein again.

Optionally, in the network device 80 shown in FIG. 10, the obtaining module 801 is configured to obtain channel occupancy information indicating that no idle subchannel exists in four subchannels, two occupied subchannels belong to a first established network, and two other occupied subchannels belong to a second established network; and the negotiation executing module 802 is configured to send a channel negotiation execution frame that includes a first channel switching manner to a network device in the first established network, and send a channel negotiation execution frame that includes a second channel switching manner to a network device in the second established network, where the first channel switching manner is to reduce a bandwidth of two subchannels occupied by the network device in the first established network to a bandwidth of one subchannel occupied, and adjust an operating frequency of the network device with the reduced bandwidth; the second channel switching manner is to reduce a bandwidth of two subchannels occupied by the network device in the second established network to a bandwidth of one subchannel occupied, and adjust the operating frequency of the network device with the reduced bandwidth; and the adjusted operating frequency of the network device in the first established network and the adjusted operating frequency of the network device in the second established network are operating frequencies that belong to a same channel.

The network device in this embodiment may be configured to implement the technical solution in the method embodiment shown in FIG. 6. Implementation principles and technical effects of the network device in this embodiment are similar to those of the method embodiment, and details are not repeated herein again.

Figure 12:
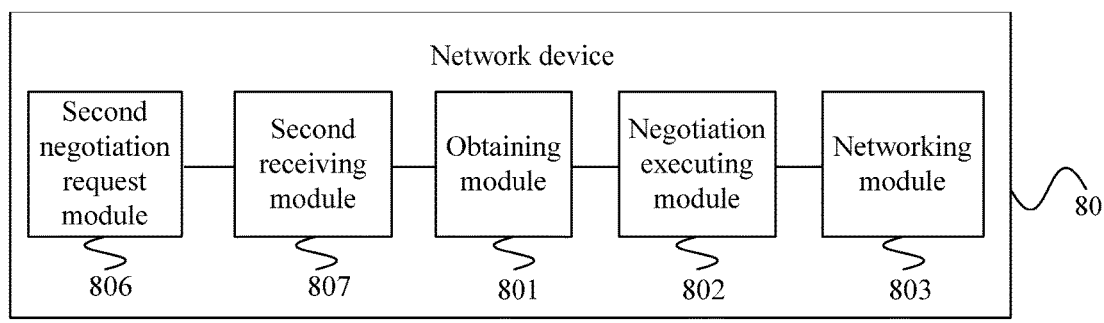
FIG. 12 is a schematic structural diagram of Embodiment 3 of a network device according to the present invention.

FIG. 12 is a schematic structural diagram of Embodiment 3 of a network device according to the present invention. As shown in FIG. 12, on the basis of the embodiment of the network device shown FIG. 10 according to the present invention, further, the network device 80 further includes a second negotiation request module 806 and a second receiving module 807. The obtaining module 801 is configured to obtain channel occupancy information indicating that no idle subchannel exists in four subchannels, two occupied subchannels belong to a first established network, and two other occupied subchannels belong to a second established network.

The second negotiation request module 806 is configured to send a channel negotiation request frame that includes a first channel switching manner to a network device in the first established network, so that the network device in the first established network determines whether a subordinate device is able to operate on a channel obtained after channel switching is performed according to the first channel switching manner, and send a channel negotiation request frame that includes a second channel switching manner to a network device in the second established network, so that the network device in the second established network determines whether a subordinate device is able to operate on a channel obtained after channel switching is performed according to the second channel switching manner.

The second receiving module 807 is configured to receive a channel negotiation success response frame that is sent by the network device in the first established network after determining that the subordinate device is able to operate on the channel, and receive a channel negotiation success response frame that is sent by the network device in the second established network after determining that the subordinate device is unable to operate on the channel.

The negotiation executing module 802 is configured to send a channel negotiation execution frame that includes the first channel switching manner to the network device in the first established network, where the first channel switching manner is to reduce a bandwidth of two subchannels occupied by the network device in the first established network to a bandwidth of one subchannel occupied, so as to generate an idle subchannel.

The networking module 803 is configured to perform the networking operation on the generated idle subchannel.

The network device in this embodiment may be configured to implement the technical solution in the method embodiment shown in FIG. 7. Implementation principles and technical effects of the network device in this embodiment are similar to those of the method embodiment, and details are not repeated herein again.

Figure 13:
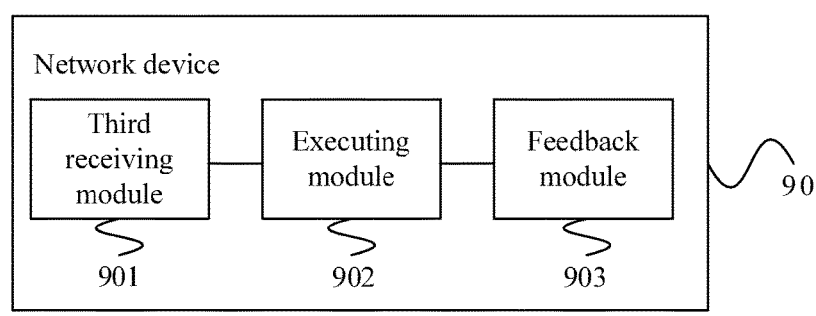
FIG. 13 is a schematic structural diagram of Embodiment 4 of a network device according to the present invention.

FIG. 13 is a schematic structural diagram of Embodiment 4 of a network device according to the present invention. As shown in FIG. 13, a network device 90 provided in the embodiment of the present invention includes a third receiving module 901, an executing module 902, and a feedback module 903. The third receiving module 901 is configured to receive a channel negotiation execution frame that is sent by a network device in a newly established network and includes a channel switching manner; the executing module 902 is configured to switch a current operating channel according to the channel switching manner to generate an idle channel; and the feedback module 903 is configured to feed back a channel negotiation execution acknowledgement frame to the network device in the newly established network, so that the network device in the newly established network performs a networking operation on the idle channel.

The network device in this embodiment may be configured to implement the technical solution in the method embodiment shown in FIG. 8. Implementation principles and technical effects of the network device in this embodiment are similar to those of the method embodiment, and details are not repeated herein again.

Figure 14:
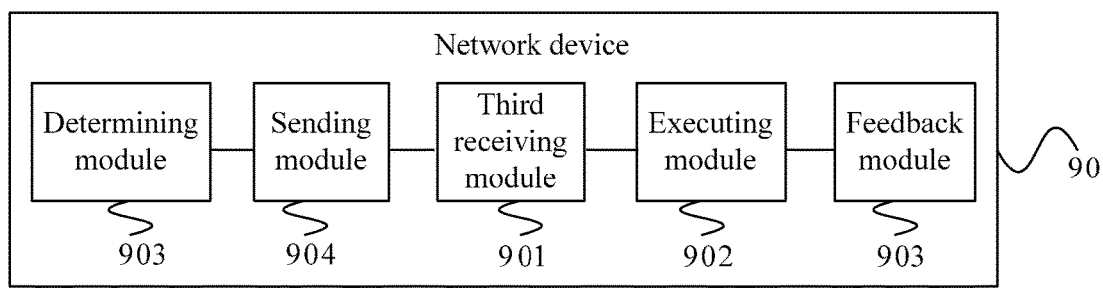
FIG. 14 is a schematic structural diagram of Embodiment 5 of a network device according to the present invention.

FIG. 14 is a schematic structural diagram of Embodiment 5 of a network device according to the present invention. As shown in FIG. 14, on the basis of the network device shown in FIG. 13 according to the embodiment of the present invention, further, the network device 90 further includes a determining module 903 and a sending module 904. The determining module 903 is configured to receive a channel negotiation request frame that is sent by the network device in the newly established network and includes the channel switching manner, and determine whether a subordinate device is able to operate on a channel obtained after channel switching is performed according to the channel switching manner; and the sending module 904 is configured to send a channel negotiation success response frame to the network device in the newly established network after it is determined that the subordinate device is able to operate on the channel.

The network device in this embodiment may be configured to implement the technical solution in the method embodiment shown in FIG. 9. Implementation principles and technical effects of the network device in this embodiment are similar to those of the method embodiment, and details are not repeated herein again.

In the following, several specific embodiments are used to describe in detail the technical solutions of embodiments of the network device shown in FIG. 13 and FIG. 14.

Optionally, the third receiving module 901 is configured to receive the channel negotiation execution frame that is sent by the network device in the newly established network and includes the channel switching manner, adjust an operating frequency according to the channel switching manner, and adjust the operating frequency to an operating frequency that belongs to a same channel as that of a network device in an established network.

Optionally, the third receiving module 901 is configured to receive the channel negotiation execution frame that is sent by the network device in the newly established network and includes the channel switching manner; reduce, according to the channel switching manner, a bandwidth of two subchannels occupied to a bandwidth of one subchannel occupied, adjust an operating frequency with the reduced bandwidth, and adjust the operating frequency to an operating frequency that belongs to the same channel as that of a network device in an established network or adjust the operating frequency to an operating frequency at which an idle subchannel is generated.

The network device in this embodiment may be configured to implement the technical solution in the method embodiment described above. Implementation principles and technical effects of the network device in this embodiment are similar to those of the method embodiment, and details are not repeated herein again.

Figure 15:
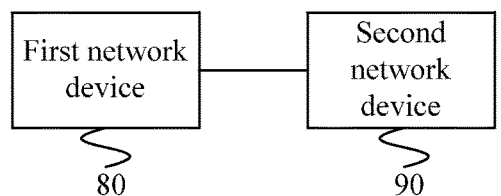
FIG. 15 is a schematic diagram of Embodiment 1 of a channel negotiation system according to an embodiment of the present invention.

FIG. 15 is a schematic diagram of Embodiment 1 of a channel negotiation system according to an embodiment of the present invention. The channel negotiation system includes the network device shown in any of FIG. 10 to FIG. 12, where the network device is called a first network device. The channel negotiation system further includes the network device shown in any of FIG. 13 to FIG. 14, where the network device is called a second network device. That is, the channel negotiation system includes the first network device and the second network device.

Figure 16:
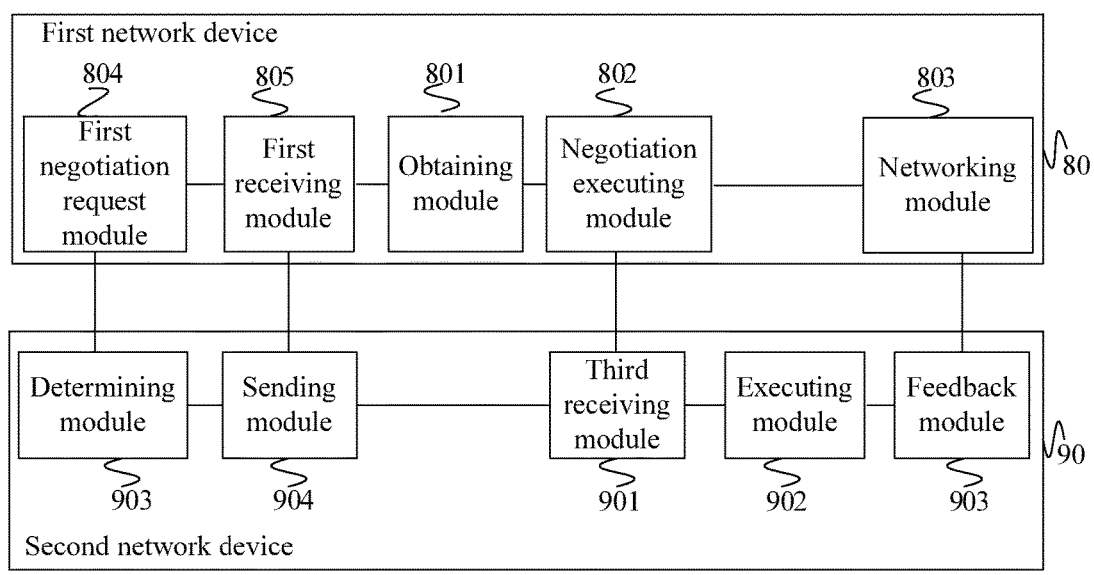
FIG. 16 is a schematic diagram of Embodiment 2 of a channel negotiation system according to an embodiment of the present invention.

FIG. 16 is a schematic diagram of Embodiment 2 of a channel negotiation system according to an embodiment of the present invention. FIG. 16 is a specific schematic structural diagram of a first network device 80 and a second network device 90, and shows relationships between modules. For detailed implementation principles and technical effects of the channel negotiation system, reference may be made to the foregoing method embodiments and device embodiments, and details are not repeated herein again.

Persons of ordinary skill in the art may understand that all or some of the steps of the method embodiments may be implemented by program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A channel negotiation method, comprising:
obtaining channel occupancy information;
sending, according to the channel occupancy information, a channel negotiation execution frame that comprises a channel switching manner to a network device in at least one established network such that the network device in the at least one established network switches a current operating channel according to the channel switching manner to generate an idle channel;
receiving a channel negotiation execution acknowledgement frame fed back by the network device in the at least one established network; and
performing a networking operation on the idle channel,
wherein obtaining the channel occupancy information comprises obtaining channel occupancy information indicating that one idle subchannel exists in four subchannels, two occupied subchannels of three occupied subchannels belong to a first established network and a remaining occupied subchannel belongs to a second established network,
wherein sending, according to the channel occupancy information, the channel negotiation execution frame that comprises the channel switching manner to the network device in the at least one established network, comprises sending a channel negotiation execution frame that comprises a first channel switching manner to a network device in the first established network, and sending a channel negotiation execution frame that comprises a second channel switching manner to a network device in the second established network,
wherein the first channel switching manner is to reduce a bandwidth of two subchannels occupied by the network device in the first established network to a bandwidth of one subchannel occupied, and adjust an operating frequency of the network device with the reduced bandwidth,
wherein the second channel switching manner is to adjust an operating frequency of the network device in the second established network, and
wherein the adjusted operating frequency of the network device in the first established network and the adjusted operating frequency of the network device in the second established network are operating frequencies that belong to a same channel.

2. A channel negotiation method, comprising:
obtaining channel occupancy information;
sending, according to the channel occupancy information, a channel negotiation execution frame that comprises a channel switching manner to a network device in at least one established network such that the network device in the at least one established network switches a current operating channel according to the channel switching manner to generate an idle channel;
receiving a channel negotiation execution acknowledgement frame fed back by the network device in the at least one established network; and
performing a networking operation on the idle channel,
wherein obtaining the channel occupancy information comprises obtaining channel occupancy information indicating that no idle subchannel exists in four subchannels, two occupied subchannels belong to a first established network, and two other occupied subchannels belong to a second established network,
wherein sending, according to the channel occupancy information, the channel negotiation execution frame that comprises the channel switching manner to the network device in the at least one established network, comprises sending a channel negotiation execution frame that comprises a first channel switching manner to a network device in the first established network, and sending a channel negotiation execution frame that comprises a second channel switching manner to a network device in the second established network,
wherein the first channel switching manner is to reduce a bandwidth of two subchannels occupied by the network device in the first established network to a bandwidth of one subchannel occupied, and adjust an operating frequency of the network device with the reduced bandwidth,
wherein the second channel switching manner is to reduce a bandwidth of two subchannels occupied by the network device in the second established network to a bandwidth of one subchannel occupied, and adjust the operating frequency of the network device with the reduced bandwidth, and
wherein the adjusted operating frequency of the network device in the first established network and the adjusted operating frequency of the network device in the second established network are operating frequencies that belong to a same channel.

3. A channel negotiation method, comprising:
obtaining channel occupancy information;
sending, according to the channel occupancy information, a channel negotiation execution frame that comprises a channel switching manner to a network device in at least one established network such that the network device in the at least one established network switches a current operating channel according to the channel switching manner to generate an idle channel;
receiving a channel negotiation execution acknowledgement frame fed back by the network device in the at least one established network; and
performing a networking operation on the idle channel,
wherein obtaining the channel occupancy information comprises obtaining channel occupancy information indicating that no idle subchannel exists in four subchannels, two occupied subchannels belong to a first established network, and two other occupied subchannels belong to a second established network, wherein before sending, according to the channel occupancy information, the channel negotiation execution frame that comprises the channel switching manner to the network device in the at least one established network, the method further comprises sending a channel negotiation request frame that comprises a first channel switching manner to a network device in the first established network such that the network device in the first established network determines whether a subordinate device is able to operate on a channel obtained after channel switching is performed according to the first channel switching manner, and sending a channel negotiation request frame that comprises a second channel switching manner to a network device in the second established network such that the network device in the second established network determines whether a subordinate device is able to operate on a channel obtained after channel switching is performed according to the second channel switching manner, and receiving a channel negotiation success response frame that is sent by the network device in the first established network after determining that the subordinate device is able to operate on the channel, and receiving a channel negotiation success response frame that is sent by the network device in the second established network after determining that the subordinate device is unable to operate on the channel, wherein sending, according to the channel occupancy information, the channel negotiation execution frame that comprises the channel switching manner to the network device in the at least one established network, comprises sending a channel negotiation execution frame that comprises the first channel switching manner to the network device in the first established network, wherein the first channel switching manner is to reduce a bandwidth of two subchannels occupied by the network device in the first established network to a bandwidth of one subchannel occupied to generate an idle subchannel, and wherein performing the networking operation on the idle channel comprises performing the networking operation on the generated idle subchannel.

4. A network device, comprising:
a non-transitory computer readable medium having instructions stored thereon; and
a computer processor coupled to the non-transitory computer readable medium and configured to execute the instructions to:
obtain channel occupancy information;
send, according to the channel occupancy information, a channel negotiation execution frame that comprises a channel switching manner to a network device in at least one established network such that the network device in the at least one established network switches a current operating channel according to the channel switching manner to generate an idle channel;
receive a channel negotiation execution acknowledgement frame fed back by the network device in the at least one established network;
perform a networking operation on the idle channel;
obtain channel occupancy information indicating that one idle subchannel exists in four subchannels, two occupied subchannels of three occupied subchannels belong to a first established network, and a remaining occupied subchannel belongs to a second established network;
send a channel negotiation execution frame that comprises a first channel switching manner to a network device in the first established network; and
send a channel negotiation execution frame that comprises a second channel switching manner to a network device in the second established network,
wherein the first channel switching manner is to reduce a bandwidth of two subchannels occupied by the network device in the first established network to a bandwidth of one subchannel occupied, and adjust an operating frequency of the network device with the reduced bandwidth,
wherein the second channel switching manner is to adjust an operating frequency of the network device in the second established network, and
wherein the adjusted operating frequency of the network device in the first established network and the adjusted operating frequency of the network device in the second established network are operating frequencies that belong to a same channel.

5. A network device, comprising:
a non-transitory computer readable medium having instructions stored thereon; and
a computer processor coupled to the non-transitory computer readable medium and configured to execute the instructions to:
obtain channel occupancy information;
send, according to the channel occupancy information, a channel negotiation execution frame that comprises a channel switching manner to a network device in at least one established network such that the network device in the at least one established network switches a current operating channel according to the channel switching manner to generate an idle channel;
receive a channel negotiation execution acknowledgement frame fed back by the network device in the at least one established network;
perform a networking operation on the idle channel;
obtain channel occupancy information indicating that no idle subchannel exists in four subchannels, two occupied subchannels belong to a first established network, and two other occupied subchannels belong to a second established network;
send a channel negotiation execution frame that comprises a first channel switching manner to a network device in the first established network; and
send a channel negotiation execution frame that comprises a second channel switching manner to a network device in the second established network,
wherein the first channel switching manner is to reduce a bandwidth of two subchannels occupied by the network device in the first established network to a bandwidth of one subchannel occupied, and adjust an operating frequency of the network device with the reduced bandwidth,
wherein the second channel switching manner is to reduce a bandwidth of two subchannels occupied by the network device in the second established network to a bandwidth of one subchannel occupied, and adjust the operating frequency of the network device with the reduced bandwidth, and
wherein the adjusted operating frequency of the network device in the first established network and the adjusted operating frequency of the network device in the second established network are operating frequencies that belong to a same channel.

6. A network device, comprising:

a non-transitory computer readable medium having instructions stored thereon; and a computer processor coupled to the non-transitory computer readable medium and configured to execute the instructions to:

obtain channel occupancy information;

send, according to the channel occupancy information, a channel negotiation execution frame that comprises a channel switching manner to a network device in at least one established network such that the network device in the at least one established network switches a current operating channel according to the channel switching manner to generate an idle channel;

receive a channel negotiation execution acknowledgement frame fed back by the network device in the at least one established network;

perform a networking operation on the idle channel;

obtain channel occupancy information indicating that no idle subchannel exists in four subchannels, two occupied subchannels belong to a first established network, and two other occupied subchannels belong to a second established network;

send a channel negotiation request frame that comprises a first channel switching manner to a network device in the first established network such that the network device in the first established network determines whether a subordinate device is able to operate on a channel obtained after channel switching is performed according to the first channel switching manner;

send a channel negotiation request frame that comprises a second channel switching manner to a network device in the second established network such that the network device in the second established network determines whether a subordinate device is able to operate on a channel obtained after channel switching is performed according to the second channel switching manner, receive a channel negotiation success response frame that is sent by the network device in the first established network after determining that the subordinate device is able to operate on the channel;

receive a channel negotiation success response frame that is sent by the network device in the second established network after determining that the subordinate device is unable to operate on the channel; and send a channel negotiation execution frame that comprises the first channel switching manner to the network device in the first established network, wherein the first channel switching manner is to reduce a bandwidth of two subchannels occupied by the network device in the first established network to a bandwidth of one subchannel occupied to generate an idle subchannel, and wherein the networking module is configured to perform the networking operation on the generated idle subchannel.

7. A network device, comprising:

a non-transitory computer readable medium having instructions stored thereon; and a computer processor coupled to the non-transitory computer readable medium and configured to execute the instructions to:

receive a channel negotiation execution frame that is sent by a network device in a newly established network and comprises a channel switching manner;

switch a current operating channel according to the channel switching manner to generate an idle channel;

feed back a channel negotiation execution acknowledgement frame to the network device in the newly established network such that the network device in the newly established network performs a networking operation on the idle channel;

receive the channel negotiation execution frame that is sent by the network device in the newly established network and comprises the channel switching manner;

reduce, according to the channel switching manner, a bandwidth of two subchannels occupied to a bandwidth of one subchannel occupied;

adjust an operating frequency with the reduced bandwidth; and adjust the operating frequency to an operating frequency that belongs to the same channel as that of a network device in an established network or adjust the operating frequency to an operating frequency at which an idle subchannel is generated.

* * * * *